US011598244B2

(12) United States Patent
Ghorpade et al.

(10) Patent No.: US 11,598,244 B2
(45) Date of Patent: Mar. 7, 2023

(54) ACTIVE BAFFLING FOR COOLING SYSTEMS

(71) Applicant: CNH Industrial America LLC, New Holland, PA (US)

(72) Inventors: Kaushal Ghorpade, Chicago, IL (US); Paul F. Wollmuth, Fargo, ND (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 17/390,314

(22) Filed: Jul. 30, 2021

(65) Prior Publication Data

US 2023/0031731 A1 Feb. 2, 2023

(51) Int. Cl.
| F01P 7/10 | (2006.01) |
| F01P 11/10 | (2006.01) |
| E02F 9/08 | (2006.01) |
| F01P 5/02 | (2006.01) |

(52) U.S. Cl.
CPC .............. *F01P 7/10* (2013.01); *E02F 9/0866* (2013.01); *F01P 5/02* (2013.01); *F01P 11/10* (2013.01); *F01P 2060/045* (2013.01)

(58) Field of Classification Search
CPC ...... F01P 7/10; F01P 5/02; F01P 11/10; F01P 2060/045; E02F 9/0866
See application file for complete search history.

(56) References Cited

U.S. PATENT DOCUMENTS

| 3,759,056 | A | * | 9/1973 | Graber | B60K 11/085 |
| | | | | | 62/181 |
| 5,141,026 | A | * | 8/1992 | Collette | F01P 7/10 |
| | | | | | 251/229 |
| 6,354,096 | B1 | * | 3/2002 | Siler | F02B 29/0475 |
| | | | | | 62/183 |
| 6,766,774 | B1 | | 7/2004 | Kussmann | |
| 6,997,143 | B2 | * | 2/2006 | Piccirilli | F01P 7/16 |
| | | | | | 123/41.1 |
| 7,814,963 | B2 | | 10/2010 | Adamson et al. | |
| 8,418,790 | B2 | | 4/2013 | Dauderman et al. | |
| 9,255,381 | B2 | | 2/2016 | Kokuryo et al. | |
| 9,581,071 | B2 | | 2/2017 | Kim et al. | |
| 9,751,377 | B2 | | 9/2017 | Kappelman et al. | |
| 2003/0079858 | A1 | * | 5/2003 | Frana-Guthrie | F01P 3/18 |
| | | | | | 165/42 |

(Continued)

FOREIGN PATENT DOCUMENTS

DE 10026047.7 A1 11/2001
JP 62017313 A * 1/1987

*Primary Examiner* — Hung Q Nguyen
(74) *Attorney, Agent, or Firm* — Rickard DeMille; Rebecca Henkel

(57) ABSTRACT

A cooling system includes a first cooler, a second cooler, a fan positioned to drive air through the first cooler and the second cooler, and a baffle system. The baffle system includes a baffle and an actuator. The baffle is positioned to facilitate selectively restricting airflow through at least a portion of the first cooler. The actuator is positioned to facilitate reconfiguring the baffle between (i) a first orientation where the baffle does not restrict the airflow through the portion of the first cooler and (ii) a second orientation where the baffle restricts the airflow through the portion of the first cooler, thereby diverting additional airflow through the second cooler.

20 Claims, 16 Drawing Sheets

(56) References Cited

U.S. PATENT DOCUMENTS

| | | | |
|---|---|---|---|
| 2004/0226764 A1* | 11/2004 | Iwasaki | F01P 7/12 180/68.1 |
| 2007/0187075 A1 | 8/2007 | Yamada et al. | |
| 2008/0257286 A1* | 10/2008 | Harich | F01P 7/10 123/41.12 |
| 2010/0218497 A1* | 9/2010 | Pettersson | F02B 29/0493 60/599 |
| 2010/0229548 A1* | 9/2010 | Kardos | F02B 29/0475 60/599 |
| 2011/0232865 A1* | 9/2011 | Mildner | F01P 7/10 165/96 |
| 2011/0281515 A1* | 11/2011 | Lockwood | F01P 7/12 165/104.34 |
| 2012/0012410 A1* | 1/2012 | Hori | B60K 11/085 180/68.1 |
| 2013/0046445 A1* | 2/2013 | Nishimura | B60K 11/085 701/49 |
| 2013/0074410 A1* | 3/2013 | Berkeland | E02F 9/0866 49/142 |
| 2014/0299077 A1* | 10/2014 | Sowards | B60K 11/085 123/41.05 |
| 2014/0301816 A1* | 10/2014 | Kokuryo | E02F 3/325 180/68.1 |
| 2015/0147949 A1* | 5/2015 | Macfarlane | F01P 7/10 454/75 |
| 2015/0152774 A1* | 6/2015 | Ritz | F01P 1/06 454/155 |
| 2016/0312437 A1* | 10/2016 | Hirayama | E02F 9/0866 |
| 2017/0326966 A1 | 11/2017 | Marcant et al. | |
| 2018/0209324 A1* | 7/2018 | Schwartz | F01P 7/048 |
| 2020/0338979 A1* | 10/2020 | Mussack | B60K 11/085 |

* cited by examiner

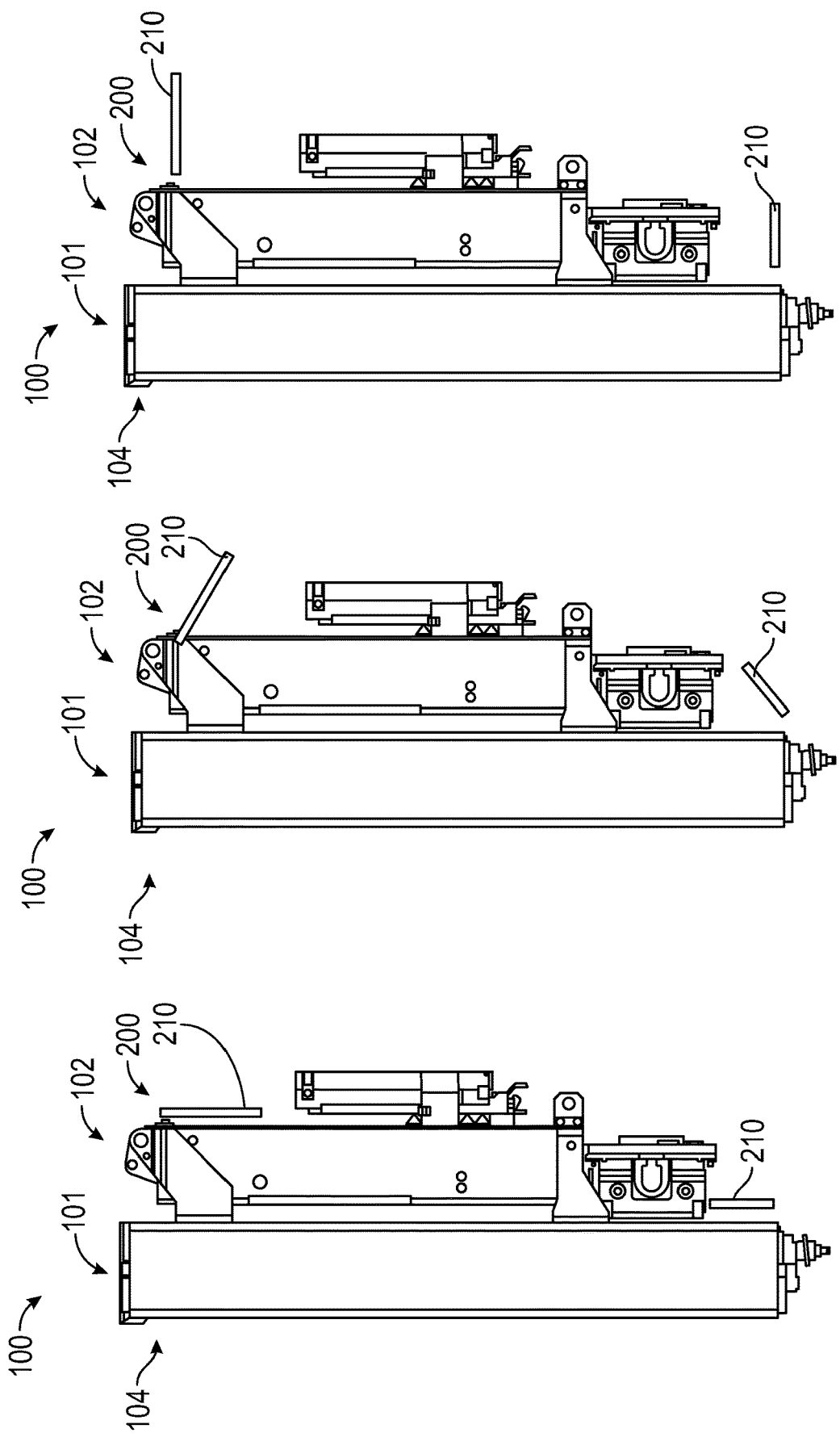

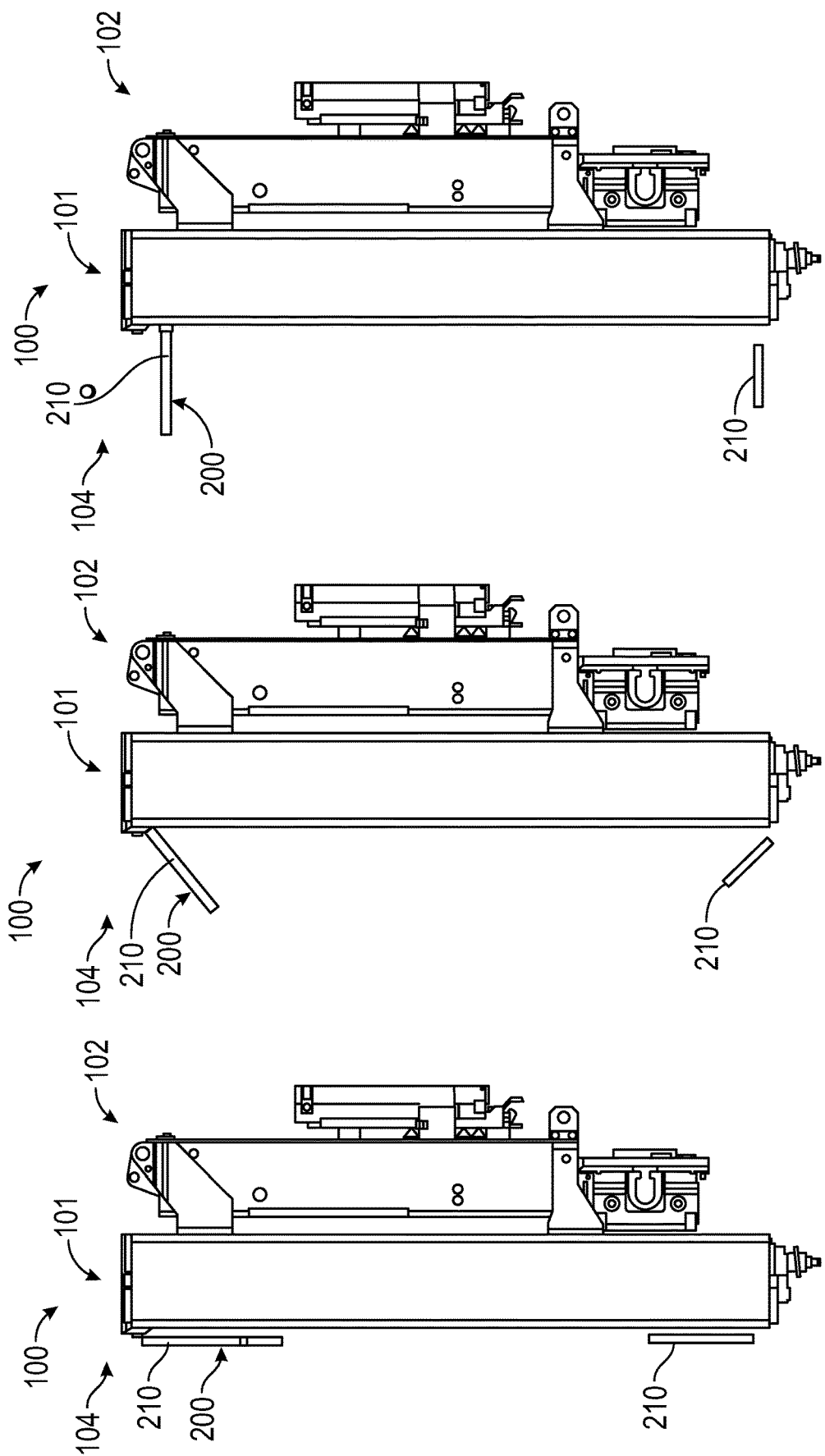

ACTIVE BAFFLING FOR COOLING SYSTEMS

BACKGROUND

Machines and vehicles include cooling packages to thermally regulate the temperature of various components and systems thereof (e.g., driveline components, hydraulic systems, air conditioning systems, etc.). The cooling packages are typically designed for the max expected heat rejection capacity for each individual cooler. It is not likely that all coolers will need max heat rejection at the same time and, therefore, there will be excess airflow through some cooler, while others may be at their max capacity. The fan of such cooling packages must spin at the highest requested speed to maintain cooling for the cooler at its max capacity, while excess air may flow through the coolers that do not require the additional airflow. Not only does this create more engine and fan noise, but driving the fan at such high speeds consumes additional engine power and fuel, decreasing the efficiency of the machine or vehicle.

SUMMARY

One embodiment relates to a cooling system for a machine. The cooling system includes a first cooler, a second cooler, a fan positioned to drive air through the first cooler and the second cooler, and a baffle system. The baffle system includes a baffle and an actuator. The baffle is positioned to facilitate selectively restricting airflow through at least a portion of the first cooler. The actuator is positioned to facilitate reconfiguring the baffle between (i) a first orientation where the baffle does not restrict the airflow through the portion of the first cooler and (ii) a second orientation where the baffle restricts the airflow through the portion of the first cooler, thereby diverting additional airflow through the second cooler.

Another embodiment relates to a machine. The machine includes an engine, a transmission coupled to the engine, a charge air circuit coupled to the engine and including a turbocharger, a hydraulic circuit including a hydraulically-operated implement, and a cooling system. The cooling system includes a first frame, a second frame coupled to the first frame and positioned in front of a portion of the first frame in a stacked arrangement, an engine radiator, a hydraulic oil cooler, a transmission cooler, a charge air cooler, a fan, and a baffle system. The engine radiator is disposed within and supported by the first frame. The engine radiator is fluidly coupled to the engine. The hydraulic oil cooler is disposed within and supported by the first frame. The hydraulic oil cooler is positioned beneath or to the side of the engine radiator. The hydraulic oil cooler is fluidly coupled to the hydraulic circuit. The transmission cooler is coupled to the first frame. The transmission cooler is positioned in front of at least a portion of the hydraulic oil cooler. The transmission cooler is fluidly coupled to the transmission. The charge air cooler is disposed within and supported by the second frame. The charge air cooler is positioned in front of a portion of the engine radiator. The charge air cooler is fluidly coupled to the charge air circuit. The fan is positioned to drive air through the engine radiator, the hydraulic oil cooler, the transmission cooler, and the charge air cooler. The baffle system includes one or more baffles and one or more actuators. The one or more baffles are positioned to facilitate selectively restricting airflow through at least one of the engine radiator, the hydraulic oil cooler, the transmission cooler, or the charge air cooler. The one or more actuators are positioned to facilitate reconfiguring the one or more baffles between a non-restrictive orientation and a restrictive orientation.

Still another embodiment relates to a cooling system for a machine. The cooling system includes a first frame, a second frame coupled to the first frame and positioned in front of a portion of the first frame in a stacked arrangement, an engine radiator, a hydraulic oil cooler, a transmission cooler, a charge air cooler, a fan, a baffle system, a plurality of sensors, and a controller. The engine radiator is disposed within and supported by the first frame. The engine radiator is configured to fluidly couple to an engine of the machine. The hydraulic oil cooler is disposed within and supported by the first frame. The hydraulic oil cooler is positioned beneath the engine radiator. The hydraulic oil cooler is configured to fluidly couple to a hydraulic circuit of the machine. The transmission cooler is coupled to an exterior of the first frame. The transmission cooler is positioned in front of a portion of the hydraulic oil cooler. The transmission cooler is configured to fluidly couple to a transmission of the machine. The charge air cooler is disposed within and supported by the second frame. The charge air cooler is positioned in front of a portion of the engine radiator. The charge air cooler is configured to fluidly couple to a charge air circuit of the machine. The fan is positioned to drive air through the engine radiator, the hydraulic oil cooler, the transmission cooler, and the charge air cooler. The baffle system includes a plurality of baffles and a plurality of actuators. The plurality of baffles are positioned to facilitate selectively restricting airflow through at least two of the engine radiator, the hydraulic oil cooler, the transmission cooler, or the charge air cooler. The plurality of actuators are positioned to facilitate reconfiguring the plurality of baffles between a non-restrictive orientation and a restrictive orientation. The plurality of sensors are configured to acquire data regarding operation of the cooling system. The controller is configured to control the plurality of actuators to selectively reconfigure each of the plurality of baffles between the non-restrictive orientation and the restrictive orientation based on the data.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE DRAWINGS

FIGS. 11-13 are various views of the baffle system of FIG. 7 in a plurality of different orientations, according to an exemplary embodiment.

FIGS. 14-16 are various views of the baffle system of FIG. 8 in a plurality of different orientations, according to an exemplary embodiment.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, a vehicle of the present disclosure includes a cooling system that includes a fan, a plurality of coolers (e.g., heat exchangers, etc.), and one or more actively controllable baffles. A control system of the vehicle monitors an operational mode of the vehicle (e.g., driving, parked, use of a hydraulic implement, etc.) and/or sensor data (e.g., coolant temperatures, component temperatures, fan speed, etc.) and controls the one or more baffles to at least partially block airflow through a first cooler to divert additional airflow through a second cooler based on the operational mode and/or the sensor data. Such airflow restriction and diversion facilitates providing additional airflow to a respective cooler of the plurality of coolers without requiring an increase in fan speed (or, in some instances, permitting a decrease in fan speed). Such baffle and fan speed control may provide noise reduction (e.g., as a result of lower fan speeds, lower engine speeds, etc.), increased fuel efficiency through engine demand reductions, and improved component cooling (e.g., by directing airflow where most needed and restricting airflow where not needed), which facilitates increased productivity with the vehicle.

Overall Vehicle

Figure 1:
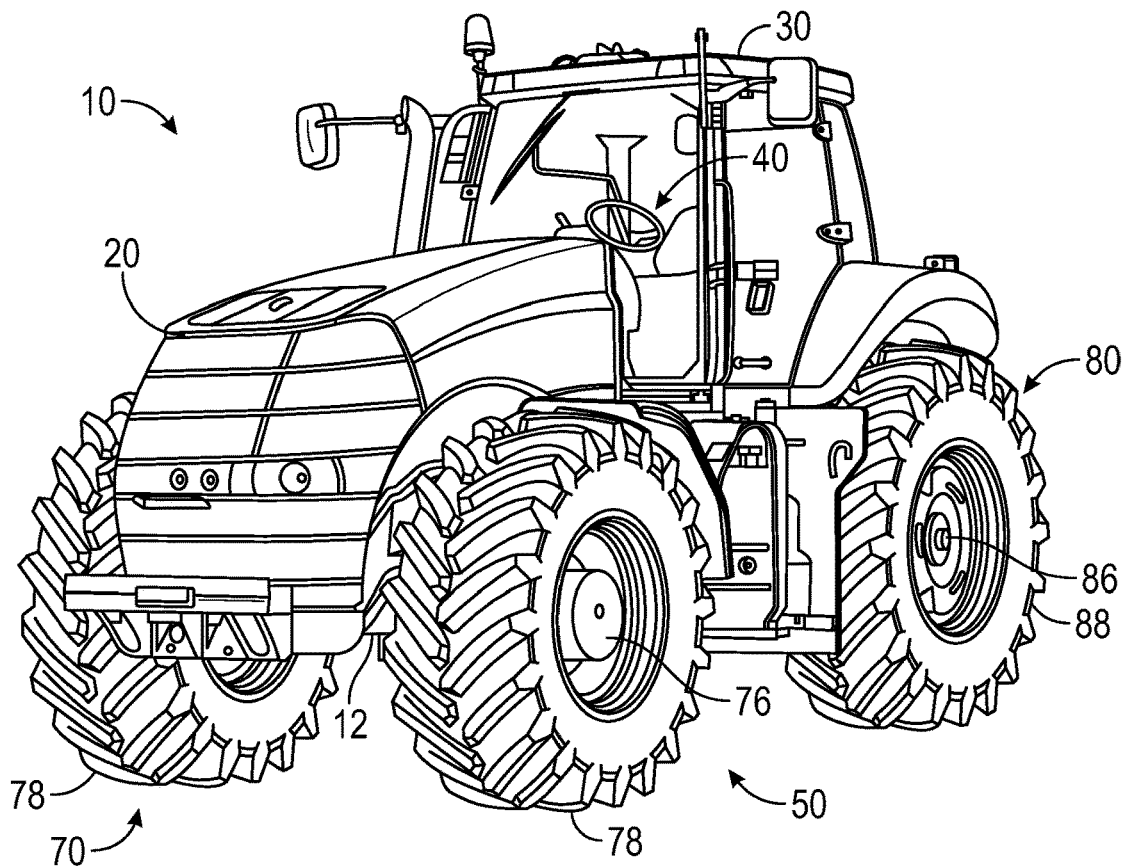
FIG. 1 is a perspective view of a vehicle, according to an exemplary embodiment.
Figure 2:
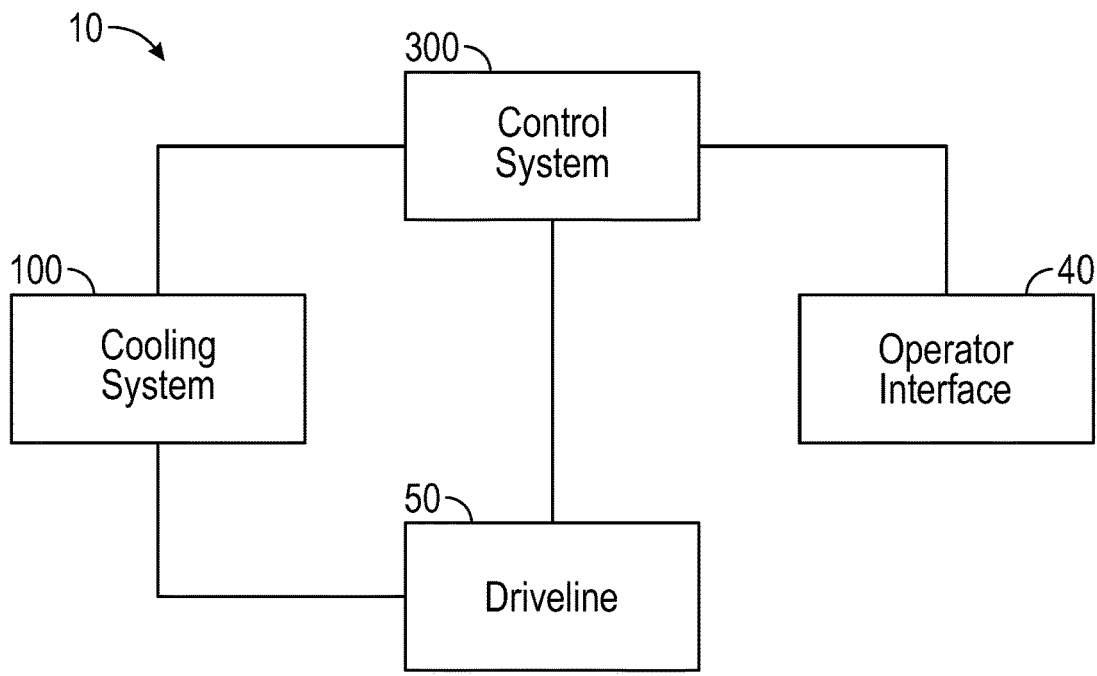
FIG. 2 is a schematic block diagram of the vehicle of FIG. 1, according to an exemplary embodiment.
Figure 3:
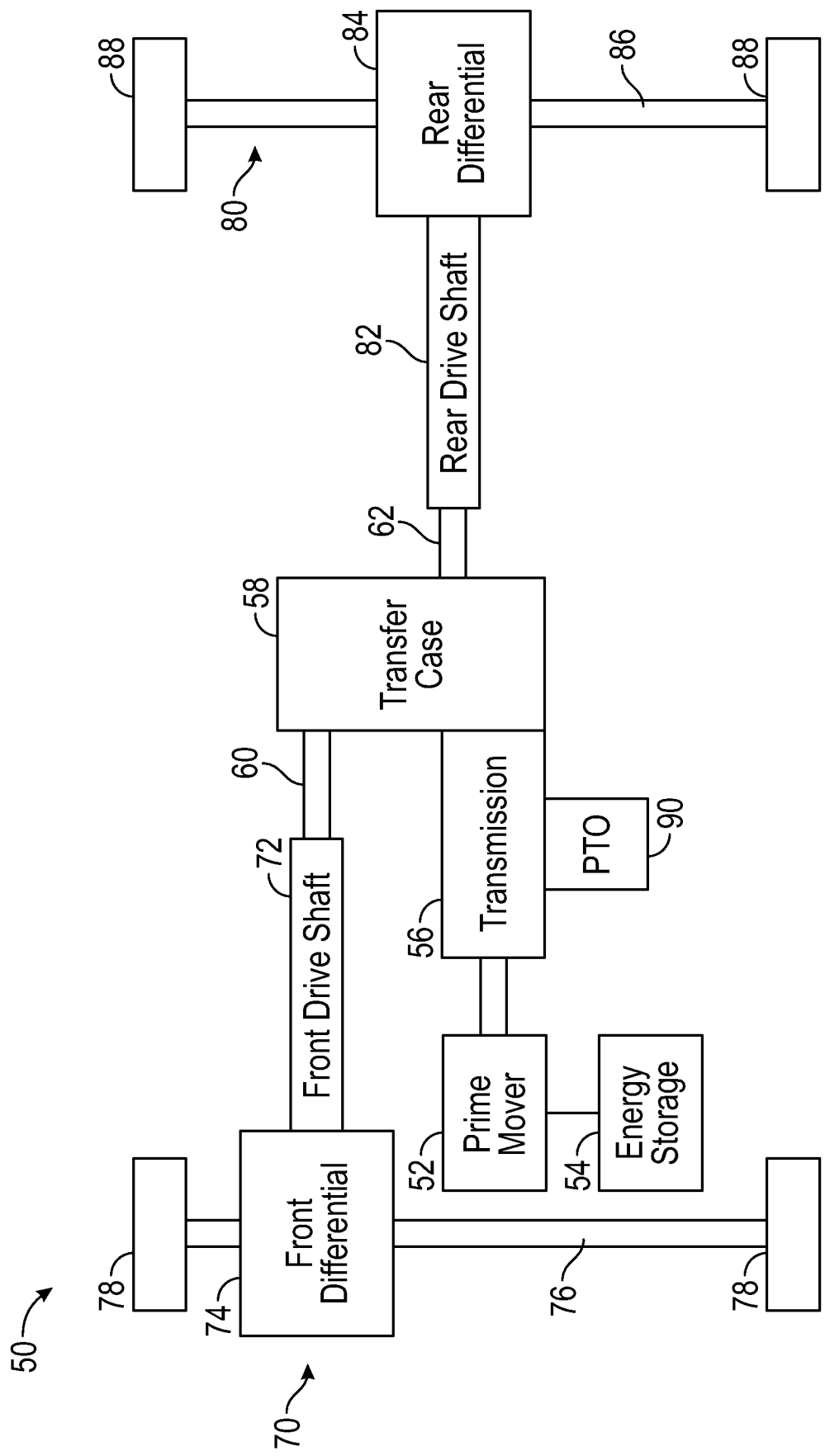
FIG. 3 is a schematic block diagram of a driveline of the vehicle of FIG. 1, according to an exemplary embodiment.

According to the exemplary embodiment shown in FIGS. 1-3, a machine or vehicle, shown as vehicle 10, includes a chassis, shown as frame 12; a body assembly, shown as body 20, coupled to the frame 12 and having an occupant portion or section, shown as cab 30; operator input and output devices, shown as operator interface 40, that are disposed within the cab 30; a drivetrain, shown as driveline 50, coupled to the frame 12 and at least partially disposed under the body 20; a vehicle cooling assembly, shown as cooling system 100, disposed under the body 20 (e.g., under a hood thereof) and configured to facilitate cooling one or more components of the vehicle 10 (e.g., an engine, a transmission, a hydraulic circuit, a forced induction or turbocharger circuit, etc.); and a vehicle control system, shown as control system 300, coupled to the operator interface 40, the driveline 50, and the cooling system 100. In other embodiments, the vehicle 10 includes more or fewer components.

According to an exemplary embodiment, the vehicle 10 is an off-road machine or vehicle. In some embodiments, the off-road machine or vehicle is an agricultural machine or vehicle such as a tractor, a telehandler, a front loader, a combine harvester, a grape harvester, a forage harvester, a sprayer vehicle, a speedrower, and/or another type of agricultural machine or vehicle. In some embodiments, the off-road machine or vehicle is a construction machine or vehicle such as a skid steer loader, an excavator, a backhoe loader, a wheel loader, a bulldozer, a telehandler, a motor grader, and/or another type of construction machine or vehicle. In some embodiments, the vehicle 10 includes one or more attached implements and/or trailed implements such as a front mounted mower, a rear mounted mower, a trailed mower, a tedder, a rake, a baler, a plough, a cultivator, a rotavator, a tiller, a harvester, and/or another type of attached implement or trailed implement.

According to an exemplary embodiment, the cab 30 is configured to provide seating for an operator (e.g., a driver, etc.) of the vehicle 10. In some embodiments, the cab 30 is configured to provide seating for one or more passengers of the vehicle 10. According to an exemplary embodiment, the operator interface 40 is configured to provide an operator with the ability to control one or more functions of and/or provide commands to the vehicle 10 and the components thereof (e.g., turn on, turn off, drive, turn, brake, engage various operating modes, raise/lower an implement, etc.). The operator interface 40 may include one or more displays and one or more input devices. The one or more displays may be or include a touchscreen, a LCD display, a LED display, a speedometer, gauges, warning lights, etc. The one or more input device may be or include a steering wheel, a joystick, buttons, switches, knobs, levers, an accelerator pedal, a brake pedal, etc.

According to an exemplary embodiment, the driveline 50 is configured to propel the vehicle 10. As shown in FIG. 3, the driveline 50 includes a primary driver, shown as prime mover 52, and an energy storage device, shown as energy storage 54. In some embodiments, the driveline 50 is a conventional driveline whereby the prime mover 52 is an internal combustion engine and the energy storage 54 is a fuel tank. The internal combustion engine may be a spark-ignition internal combustion engine or a compression-ignition internal combustion engine that may use any suitable fuel type (e.g., diesel, ethanol, gasoline, natural gas, propane, etc.). In some embodiments, the driveline 50 is an electric driveline whereby the prime mover 52 is an electric motor and the energy storage 54 is a battery system. In some embodiments, the driveline 50 is a fuel cell electric driveline whereby the prime mover 52 is an electric motor and the energy storage 54 is a fuel cell (e.g., that stores hydrogen, that produces electricity from the hydrogen, etc.). In some embodiments, the driveline 50 is a hybrid driveline whereby (i) the prime mover 52 includes an internal combustion engine and an electric motor/generator and (ii) the energy storage 54 includes a fuel tank and/or a battery system.

As shown in FIG. 3, the driveline 50 includes a transmission device (e.g., a gearbox, a continuous variable transmission ("CVT"), etc.), shown as transmission 56, coupled to the prime mover 52; a power divider, shown as transfer case 58, coupled to the transmission 56; a first tractive assembly, shown as front tractive assembly 70, coupled to a first output of the transfer case 58, shown as front output 60; and a second tractive assembly, shown as rear tractive assembly 80, coupled to a second output of the transfer case 58, shown as rear output 62. According to an exemplary embodiment, the transmission 56 has a variety of configurations (e.g., gear ratios, etc.) and provides different output speeds relative to a mechanical input received thereby from the prime mover 52. In some embodiments (e.g., in electric driveline configurations, in hybrid driveline configurations, etc.), the driveline 50 does not include the transmission 56. In such embodiments, the prime mover 52 may be directly coupled to the transfer case 58. According to an exemplary embodiment, the transfer case 58 is configured to facilitate driving both the front tractive assembly 70 and the rear tractive assembly 80 with the prime mover 52 to facilitate front and rear drive (e.g., an all-wheel-drive vehicle, a four-wheel-drive vehicle, etc.). In some embodiments, the transfer case 58 facilitates selectively engaging rear drive only, front drive only, and both front and rear drive simultaneously. In some embodiments, the transmission 56 and/or the transfer case 58 facilitate selectively disengaging the front tractive assembly 70 and the rear tractive assembly 80 from the prime mover 52 (e.g., to permit free movement of the front tractive assembly 70 and the rear tractive assembly 80 in a neutral mode of operation). In some embodiments, the driveline 50 does not include the transfer case 58. In such embodiments, the prime mover 52 or the transmission 56 may directly drive the front tractive assembly 70 (i.e., a front-wheel-drive vehicle) or the rear tractive assembly 80 (i.e., a rear-wheel-drive vehicle).

As shown in FIGS. 1 and 3, the front tractive assembly 70 includes a first drive shaft, shown as front drive shaft 72, coupled to the front output 60 of the transfer case 58; a first differential, shown as front differential 74, coupled to the front drive shaft 72; a first axle, shown front axle 76, coupled to the front differential 74; and a first pair of tractive elements, shown as front tractive elements 78, coupled to the front axle 76. In some embodiments, the front tractive assembly 70 includes a plurality of front axles 76. In some embodiments, the front tractive assembly 70 does not include the front drive shaft 72 or the front differential 74 (e.g., a rear-wheel-drive vehicle). In some embodiments, the front drive shaft 72 is directly coupled to the transmission 56 (e.g., in a front-wheel-drive vehicle, in embodiments where the driveline 50 does not include the transfer case 58, etc.) or the prime mover 52 (e.g., in a front-wheel-drive vehicle, in embodiments where the driveline 50 does not include the transfer case 58 or the transmission 56, etc.). The front axle 76 may include one or more components.

As shown in FIGS. 1 and 3, the rear tractive assembly 80 includes a second drive shaft, shown as rear drive shaft 82, coupled to the rear output 62 of the transfer case 58; a second differential, shown as rear differential 84, coupled to the rear drive shaft 82; a second axle, shown rear axle 86, coupled to the rear differential 84; and a second pair of tractive elements, shown as rear tractive elements 88, coupled to the rear axle 86. In some embodiments, the rear tractive assembly 80 includes a plurality of rear axles 86. In some embodiments, the rear tractive assembly 80 does not include the rear drive shaft 82 or the rear differential 84 (e.g., a front-wheel-drive vehicle). In some embodiments, the rear drive shaft 82 is directly coupled to the transmission 56 (e.g., in a rear-wheel-drive vehicle, in embodiments where the driveline 50 does not include the transfer case 58, etc.) or the prime mover 52 (e.g., in a rear-wheel-drive vehicle, in embodiments where the driveline 50 does not include the transfer case 58 or the transmission 56, etc.). The rear axle 86 may include one or more components. According to the exemplary embodiment shown in FIG. 1, the front tractive elements 78 and the rear tractive elements 88 are structured as wheels. In other embodiments, the front tractive elements 78 and the rear tractive elements 88 are otherwise structured (e.g., tracks, etc.). In some embodiments, the front tractive elements 78 and the rear tractive elements 88 are both steerable. In other embodiments, only one of the front tractive elements 78 or the rear tractive elements 88 is steerable. In still other embodiments, both the front tractive elements 78 and the rear tractive elements 88 are fixed and not steerable.

In some embodiments, the driveline 50 includes a plurality of prime movers 52. By way of example, the driveline 50 may include a first prime mover 52 that drives the front tractive assembly 70 and a second prime mover 52 that drives the rear tractive assembly 80. By way of another example, the driveline 50 may include a first prime mover 52 that drives a first one of the front tractive elements 78, a second prime mover 52 that drives a second one of the front tractive elements 78, a third prime mover 52 that drives a first one of the rear tractive elements 88, and/or a fourth prime mover 52 that drives a second one of the rear tractive elements 88. By way of still another example, the driveline 50 may include a first prime mover that drives the front tractive assembly 70, a second prime mover 52 that drives a first one of the rear tractive elements 88, and a third prime mover 52 that drives a second one of the rear tractive elements 88. By way of yet another example, the driveline 50 may include a first prime mover that drives the rear tractive assembly 80, a second prime mover 52 that drives a first one of the front tractive elements 78, and a third prime mover 52 that drives a second one of the front tractive elements 78. In such embodiments, the driveline 50 may not include the transmission 56 or the transfer case 58.

As shown in FIG. 3, the driveline 50 includes a power-take-off ("PTO"), shown as PTO 90. While the PTO 90 is shown as being an output of the transmission 56, in other embodiments the PTO 90 may be an output of the prime mover 52, the transmission 56, and/or the transfer case 58. According to an exemplary embodiment, the PTO 90 is configured to facilitate driving an attached implement and/or a trailed implement of the vehicle 10. In some embodiments, the driveline 50 includes a PTO clutch positioned to selectively decouple the driveline 50 from the attached implement and/or the trailed implement of the vehicle 10 (e.g., so that the attached implement and/or the trailed implement is only operated when desired, etc.).

According to an exemplary embodiment, the vehicle 10 includes a braking system that includes one or more brakes (e.g., disc brakes, drum brakes, in-board brakes, axle brakes, etc.) positioned to facilitate selectively braking (i) one or more components of the driveline 50 and/or (ii) one or more components of a trailed implement. In some embodiments, the one or more brakes include (i) one or more front brakes positioned to facilitate braking one or more components of the front tractive assembly 70 and (ii) one or more rear brakes positioned to facilitate braking one or more components of the rear tractive assembly 80. In some embodiments, the one or more brakes include only the one or more front brakes. In some embodiments, the one or more brakes include only the one or more rear brakes. In some embodiments, the one or more front brakes include two front brakes, one positioned to facilitate braking each of the front tractive elements 78. In some embodiments, the one or more front brakes include at least one front brake positioned to facilitate braking the front axle 76. In some embodiments, the one or more rear brakes include two rear brakes, one positioned to facilitate braking each of the rear tractive elements 88. In some embodiments, the one or more rear brakes include at least one rear brake positioned to facilitate braking the rear axle 86. Accordingly, the braking system may include one or more brakes to facilitate braking the front axle 76, the front tractive elements 78, the rear axle 86, and/or the rear tractive elements 88. In some embodiments, the one or more brakes additionally include one or more trailer brakes of a trailed implement attached to the vehicle 10. The trailer brakes are positioned to facilitate selectively braking one or more axles and/or one or more tractive elements (e.g., wheels, etc.) of the trailed implement.

Cooling System

According to the exemplary embodiment shown in FIGS. 4-8, the cooling system 100 includes a first cooling pack, shown as cooling pack 101, having a first side, shown as front side 102, that faces toward a front end of the vehicle 10 and an opposing second side, shown as rear side 104, that faces toward the prime mover 52 of the driveline 50. As shown in FIGS. 4-8, the cooling pack 101 includes various frame components, shown as frame assembly 110, including (i) a first or main frame component, shown as main frame 112, and (ii) a second or secondary frame component, shown as secondary frame 114, coupled to the main frame 112 by a plurality of frame brackets, shown as brackets 116. According to the exemplary embodiment shown in FIGS. 4-8, the secondary frame 114 is smaller than the main frame 112, and the secondary frame 114 is positioned in front of and spaced from at least a portion (e.g., an upper portion, etc.) of the main frame 112 to provide a stacked arrangement of the main frame 112 and the secondary frame 114. However, it should be understood that in other embodiments, the main frame 112 and the secondary frame 114 may be arranged in a different arrangement (e.g., depending on the packaging constraints of the vehicle 10). By way of example, the secondary frame 114 may be positioned above, below, or to the sides of the main frame 112.

According to an exemplary embodiment, the cooling pack 101 includes a plurality of cooling components (e.g., heat exchangers, etc.) configured to facilitate cooling one or more components of the vehicle 10. As shown in FIGS. 4, 5, 7, and 8, the plurality of cooling components of the cooling pack 101 include (i) a first cooling component, shown as engine radiator 120, disposed within and supported by the main frame 112; (ii) a second cooling component, shown as hydraulic oil cooler 130, disposed within and supported by the main frame 112 and positioned beneath the engine radiator 120 (e.g., a vertically stacked arrangement); (iii) a third cooling component, shown as transmission cooler 140, having coupling brackets, shown as transmission cooler brackets 142, that couple the transmission cooler 140 to an exterior of the main frame 112 proximate a bottom end thereof such that the transmission cooler 140 is positioned at least partially in front of the hydraulic oil cooler 130; (iv) a fourth cooling component, shown as fuel cooler 150, having coupling brackets, shown as fuel cooler brackets 152, that couple the fuel cooler 150 to an exterior of the frame assembly 110 such that the fuel cooler 150 is positioned at least partially in front of the transmission cooler 140; (v) a fifth cooling component, shown as charge air cooler 160, disposed within and supported by the secondary frame 114 and positioned at least partially in front of the engine radiator 120; (vi) a sixth cooling component, shown as condenser 170, having coupling brackets, shown as condenser brackets 172, that couple the condenser 170 to an exterior of the secondary frame 114 such that the condenser 170 is positioned at least partially in front of the charge air cooler 160; and (vii) a seventh cooling component, shown as water-to-air intercooler assembly 180, positioned behind the rear side 104 of the frame assembly 110 and coupled to the prime mover 52.

Figure 4:
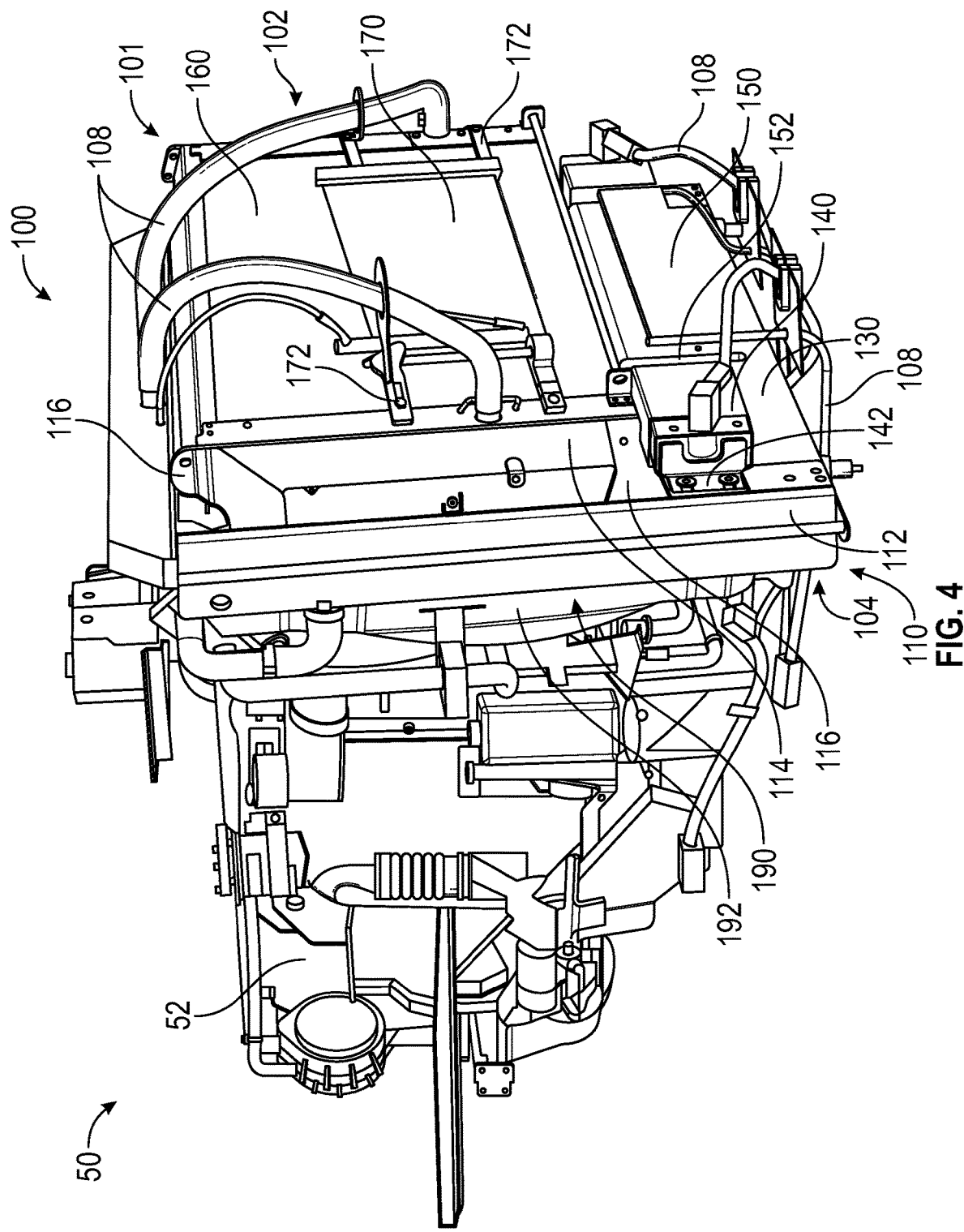
FIG. 4 is a front, right perspective view of a cooling system of the vehicle of FIG. 1, according to an exemplary embodiment.
Figure 5:
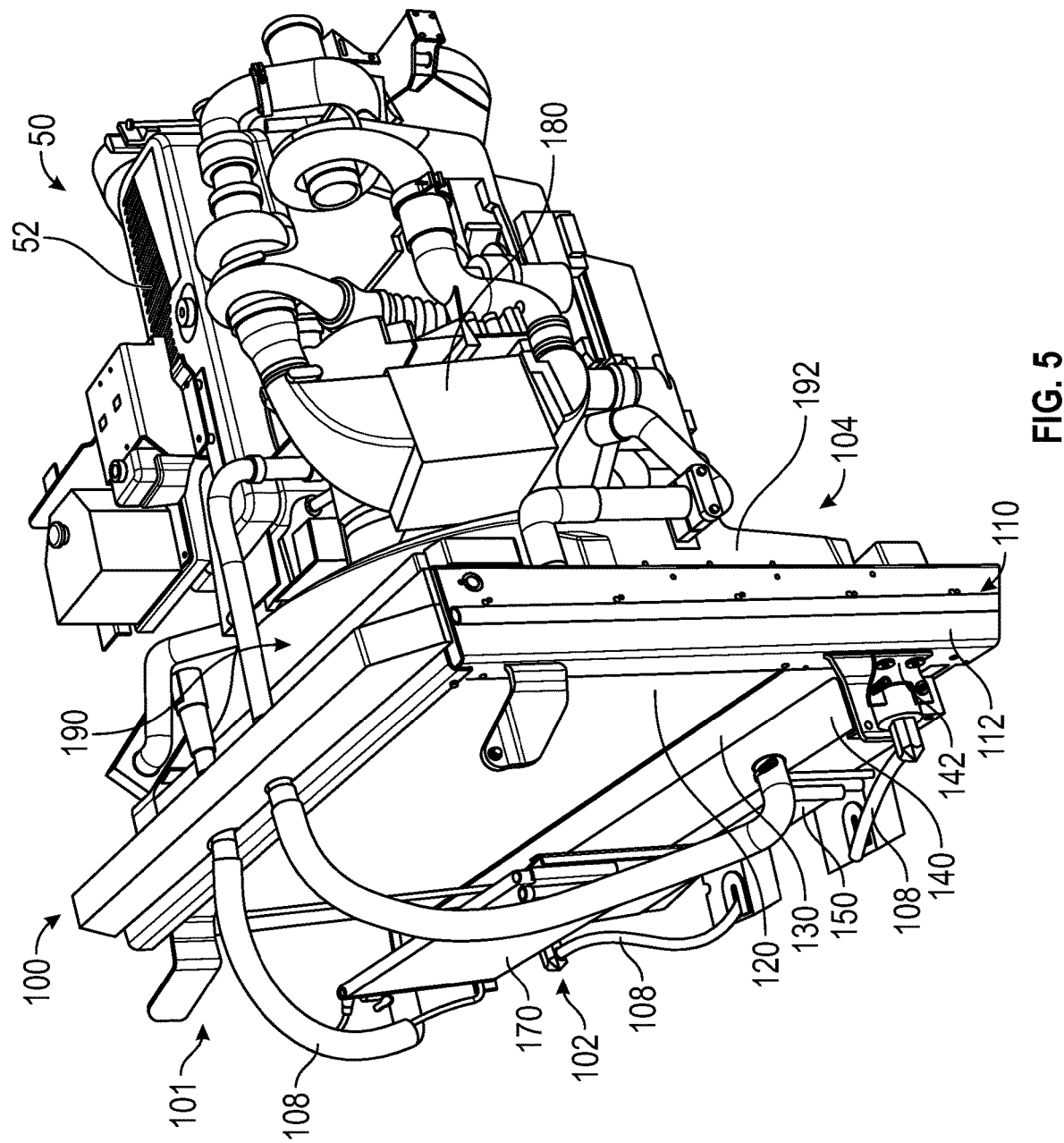
FIG. 5 is front, left perspective view of the cooling system of FIG. 4, according to an exemplary embodiment.
Figure 6:
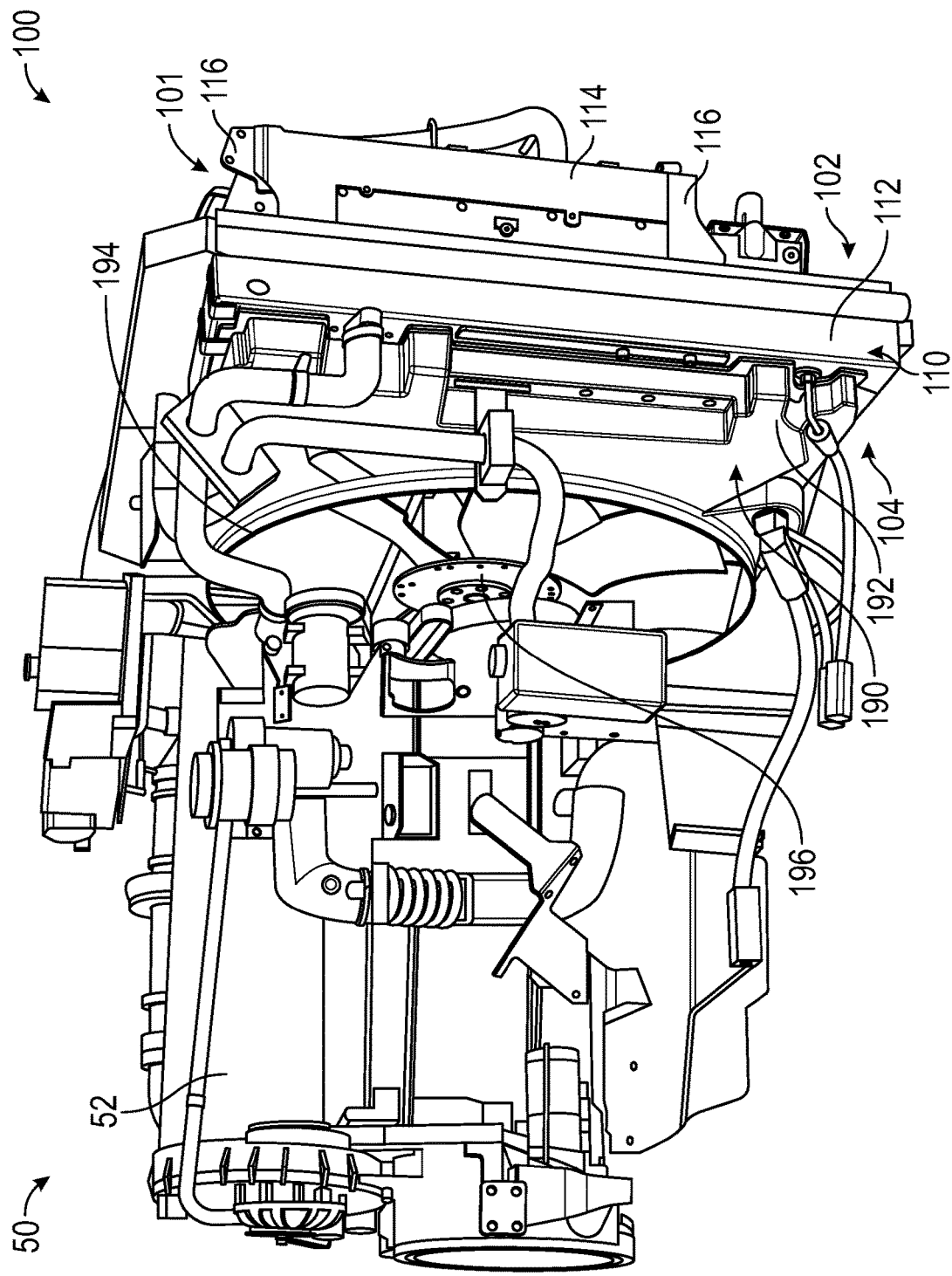
FIG. 6 is a rear, right perspective view of the cooling system of FIG. 4, according to an exemplary embodiment.

As shown in FIGS. 4-6, the cooling system 100 includes a plurality of conduits, shown as conduits 108, that extend from the various cooling components of the cooling pack 101 (e.g., the engine radiator 120, the hydraulic oil cooler 130, the transmission cooler 140, the fuel cooler 150, the charge air cooler 160, the condenser 170, etc.) to various components of the driveline 50 and the vehicle 10. By way of example, the conduits 108 may couple the engine radiator 120 to an engine of the prime mover 52 to cool engine coolant for the engine. By way of another example, the conduits 108 may couple the hydraulic oil cooler 130 to a hydraulic circuit of the vehicle 10 to cool hydraulic oil and/or hydraulic components (e.g., hydraulic pump(s), hydraulic oil reservoir(s), hydraulic cylinder(s), etc.) within the hydraulic circuit. By way of another example, the conduits 108 may couple the transmission cooler 140 to the transmission 56 to cool transmission oil of the transmission 56. By way of another example, the conduits 108 may couple the fuel cooler 150 to a fueling circuit of the vehicle 10 to cool fuel within the fueling circuit. By way of another example, the conduits 108 may couple the charge air cooler 160 between the engine and turbocharger assembly (i.e., the charge air circuit) of the vehicle 10 to cool charged air exiting the turbocharger and before entering the engine. By way of another example, the conduits 108 may couple the condenser 170 to an air conditioning circuit of the vehicle 10 to cool air conditioning refrigerant within the air conditioning circuit.

It should be understood the above description of the plurality of cooling components of the cooling pack 101 is for example purposes only and should not be considered limiting. In other embodiments, the cooling pack 101 includes different cooling components, includes additional cooling components, include fewer cooling components, and/or the cooling components thereof are arranged differently.

As shown in FIGS. 4-6, the cooling system 100 includes a fan assembly, shown as fan system 190, including a fan housing, shown as fan shroud 192, coupled to the rear side 104 of the main frame 112 such that the fan system 190 is positioned behind the cooling pack 101. As shown in FIG. 6, the fan shroud 192 defines an outlet, shown as air outlet 194, and the fan system 190 includes an air driver, shown as fan 196, positioned within the fan shroud 192. According to an exemplary embodiment, the fan 196 is driven (e.g., by the prime mover 52, by an independent fan driver, etc.) and pulls air from in front of the cooling pack 101, through the various cooling components thereof (e.g., the engine radiator 120, the hydraulic oil cooler 130, the transmission cooler 140, the fuel cooler 150, the charge air cooler 160, the condenser 170, etc.), and out of the air outlet 194. While shown as being positioned on the rear side 104 of the cooling pack 101, in other embodiments, the fan system 190 is positioned on the front side 102 of the cooling pack 101 such that the fan 196 pushes air through the various cooling components of the cooling pack 101.

Figure 7:
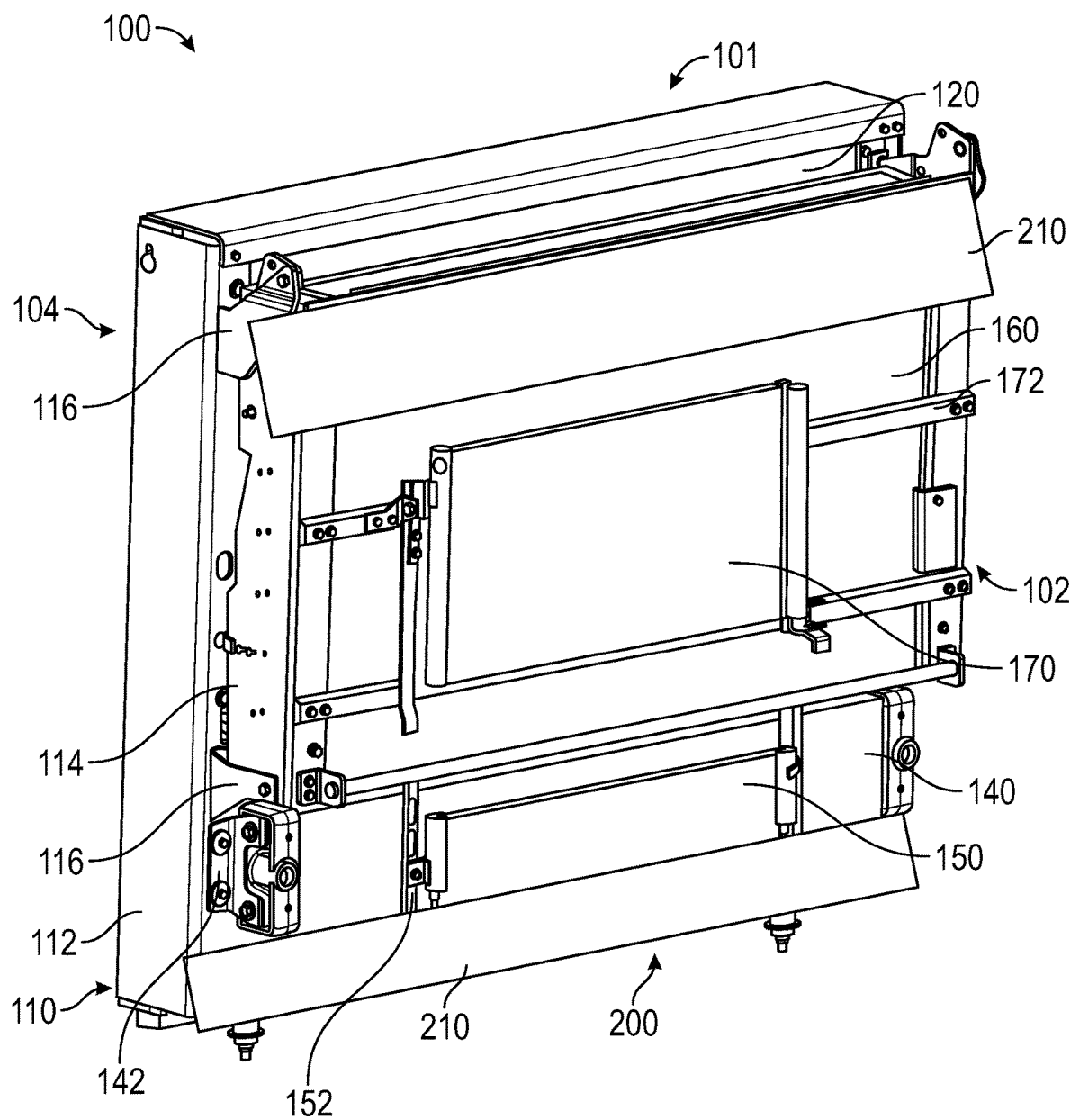
FIG. 7 is a detailed front perspective view of the cooling system of FIG. 4 having a baffle system coupled to a front side thereof, according to an exemplary embodiment.
Figure 8:
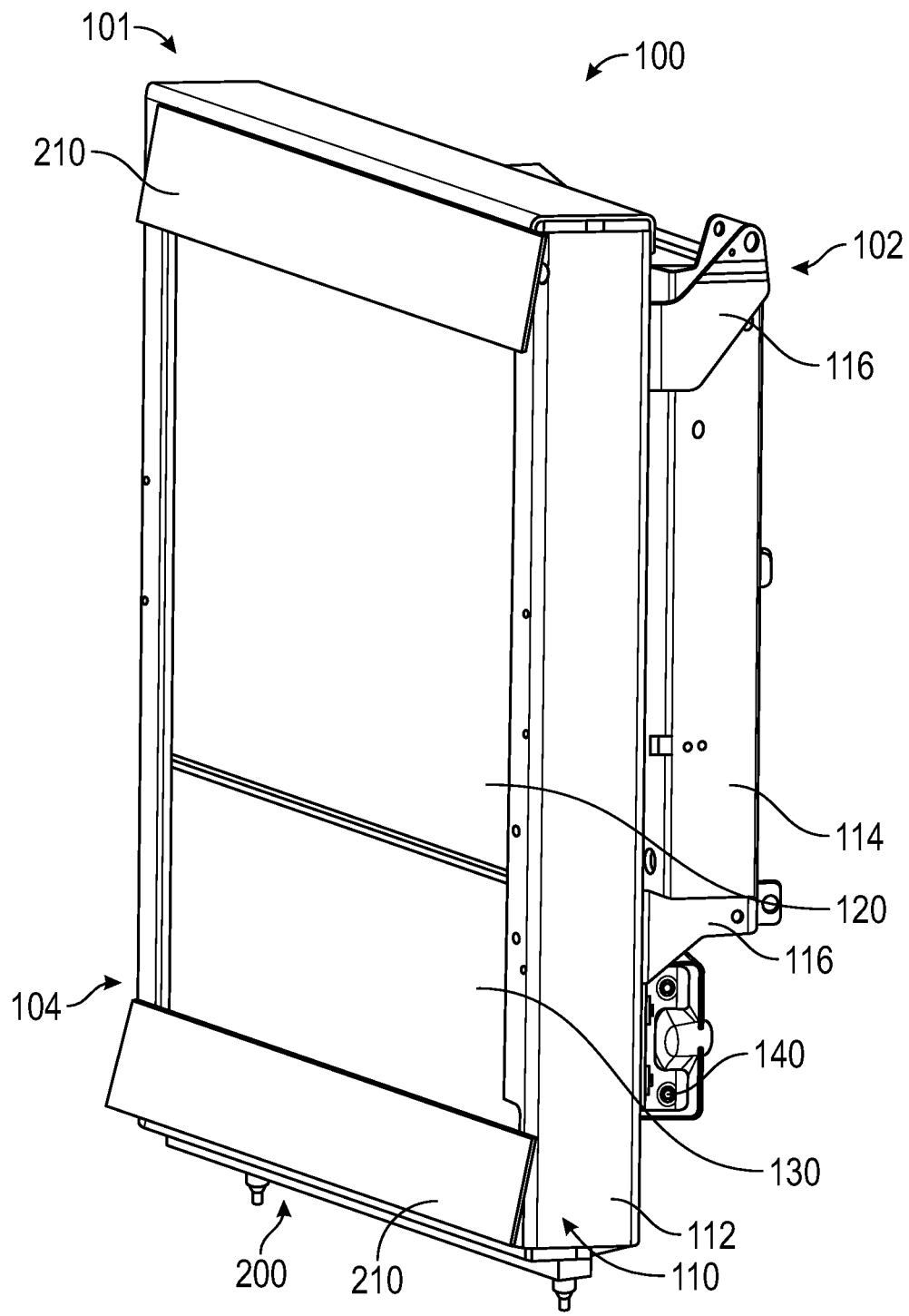
FIG. 8 is a detailed rear perspective view of the cooling system of FIG. 4 having the baffle system coupled to a rear side thereof, according to another exemplary embodiment.

As shown in FIGS. 7-16, the cooling system 100 includes a baffle assembly, shown as baffle system 200. The baffle system 200 includes one or more baffles (e.g., a panel, a door, a plate, etc.), shown as baffle doors 210. As shown in FIG. 7, the baffle system 200 includes two front baffle doors 210 positioned on the front side 102 of the cooling pack 101: (i) a front upper baffle door 210 coupled to the secondary frame 114 such that the front upper baffle door 210 is positioned in front of at least a portion of the charge air cooler 160 and (ii) a front lower baffle door 210 coupled to the main frame 112 such that the front lower baffle door 210 is positioned in front of at least a portion of the hydraulic oil cooler 130 and beneath the transmission cooler 140. As shown in FIG. 8, the baffle system 200 additionally or alternatively includes two rear baffle doors 210 positioned on the rear side 104 of the cooling pack 101: (i) a rear upper baffle door 210 coupled to the main frame 112 such that the rear upper baffle door 210 is positioned behind at least a portion of the engine radiator 120 and (ii) a rear lower baffle door 210 coupled to the main frame 112 such that the rear lower baffle door 210 is positioned behind at least a portion of the hydraulic oil cooler 130. The baffle doors 210 may be manufactured from a substantially rigid material such as metal or metal alloys (e.g., steel, aluminum, etc.), plastics, composite materials (e.g., carbon fiber reinforced plastics, etc.), and/or other suitable materials.

It should be understood the above description of the baffle doors 210 of the cooling pack 101 is for example purposes only and should not be considered limiting. In other embodiments, the baffle system 200 of the cooling pack 101 includes a different arrangement of the baffle doors 210. By way of example, the baffle system 200 may include the front upper baffle door 210 and the rear lower baffle door 210. By way of another example, the baffle system 200 may include the rear upper baffle door 210 and the front lower baffle door 210. By way of another example, the baffle system 200 may include only one baffle door 210. By way of another example, the baffle system 200 may include the front upper baffle door 210, the front lower baffle door 210, the rear upper baffle door 210, and the rear lower baffle door 210. By way of another example, the baffle doors 210 may be otherwise positioned (e.g., in front of the condenser 170, the transmission cooler 140, the fuel cooler 150, etc.). By way of another example, the baffle system 200 may include three or more baffle doors 210 position about the front side 102. By way of another example, the baffle system 200 may include three or more baffle doors 210 positioned about the rear side 104 of the cooling pack 101.

Figure 9:
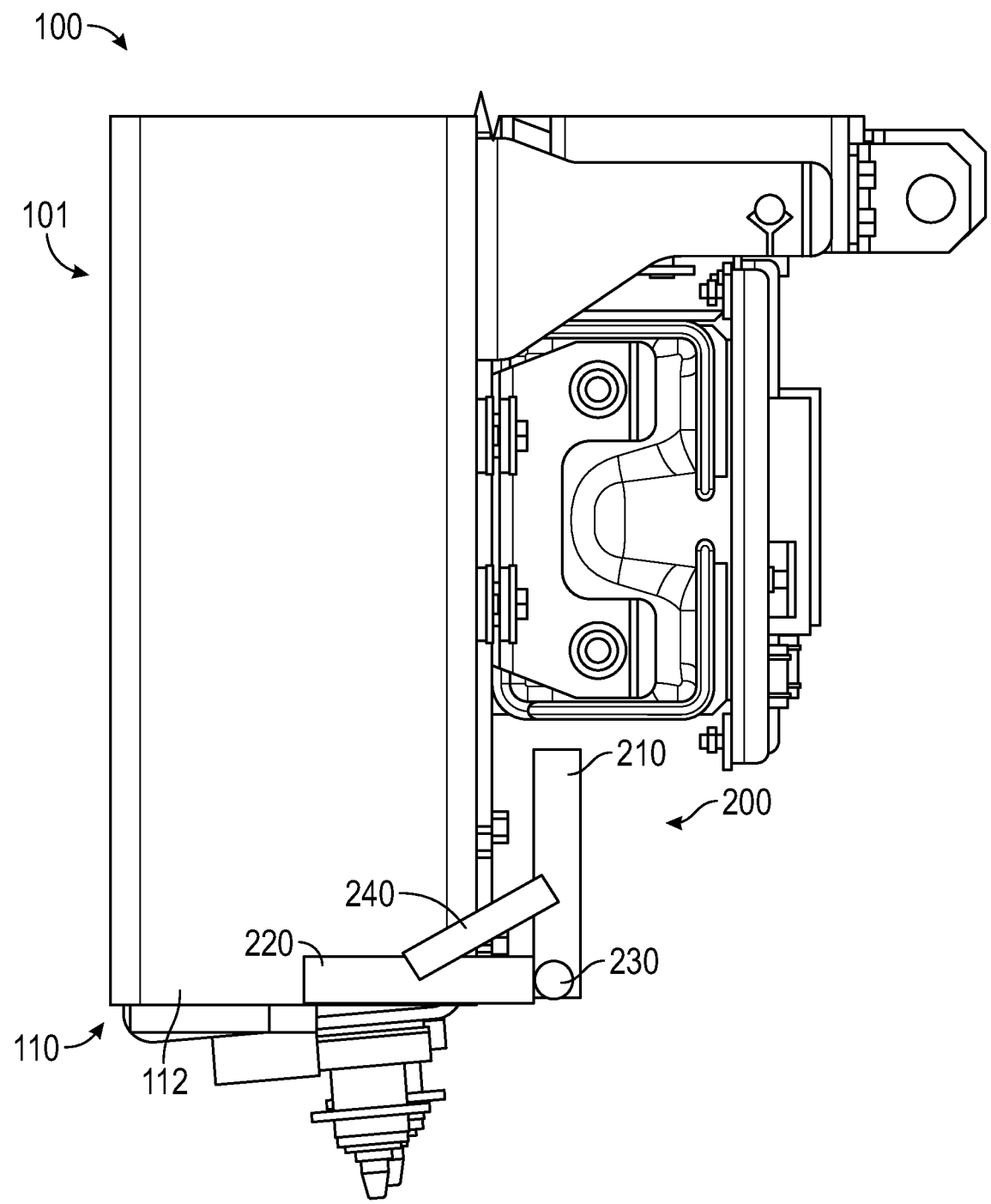
FIG. 9 is a detailed view of the baffle system of FIGS. 7 and 8, according to an exemplary embodiment.
Figure 10:
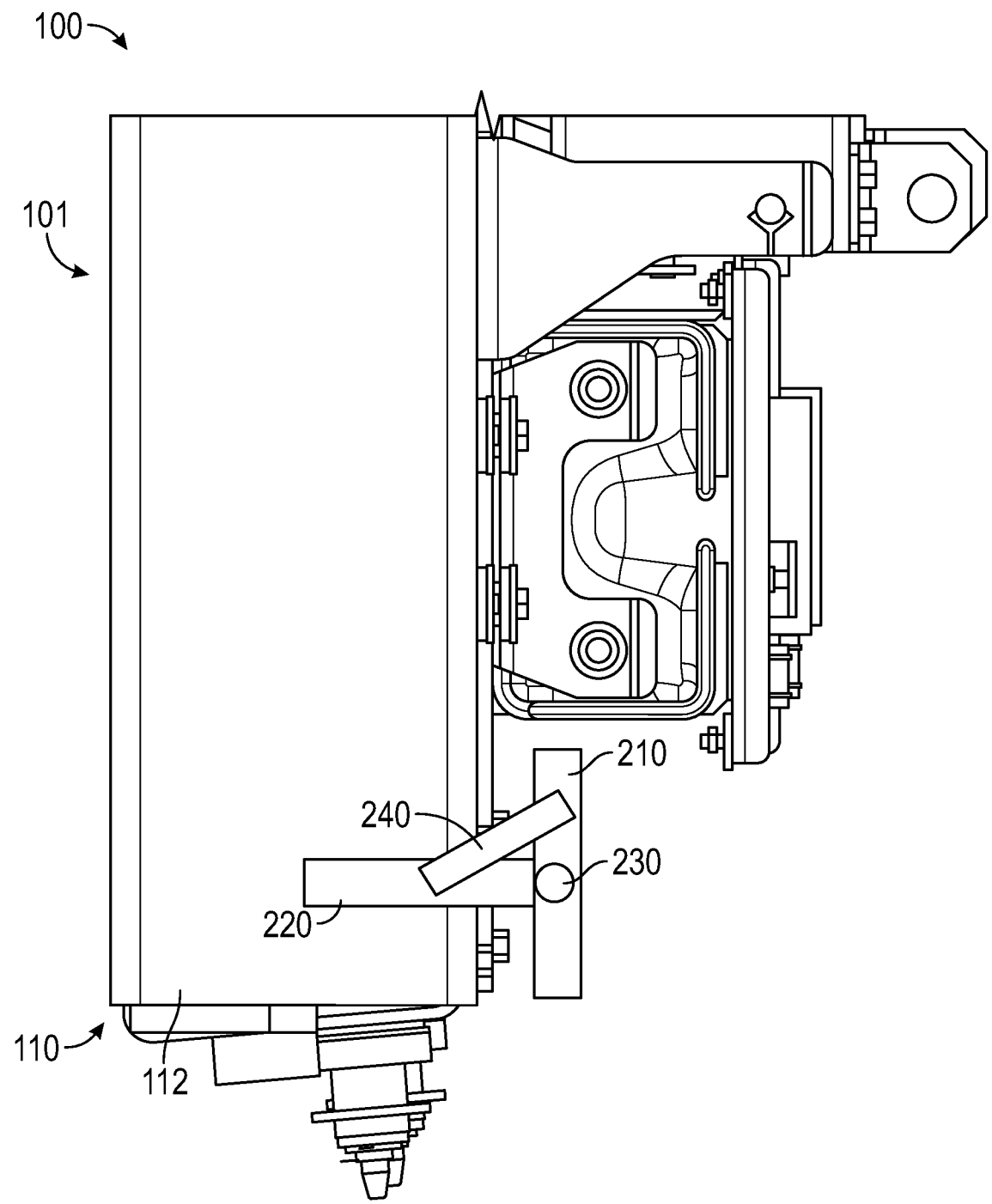
FIG. 10 is a detailed view of the baffle system of FIGS. 7 and 8, according to another exemplary embodiment.

As shown in FIGS. 9 and 10, each baffle assembly of the baffle system 200 includes a bracket, shown as baffle bracket 220, coupled to and extending from the frame assembly 110 (e.g., the main frame 112, the secondary frame 114, etc.); a joint, shown as baffle pivot 230, coupled to the baffle bracket 220 and to which one of the baffle doors 210 is pivotally coupled; and an actuator, shown as baffle actuator 240, positioned to selectively pivot the baffle door 210 about the baffle pivot 230 relative to the baffle bracket 220, and thereby relative to the cooling components of cooling pack 101. As shown in FIG. 9, the baffle pivot 230 is positioned at the edge (e.g., the lower edge, the upper edge, etc.) of the baffle door 210 such that the baffle door 210 pivots about one of the edges thereof. As shown in FIG. 10, the baffle pivot 230 is positioned at the middle of the baffle door 210 such that the baffle door 210 pivots about a central, longitudinal axis thereof.

In one embodiment, the baffle actuators 240 are linear actuators. In another embodiment, the baffle actuators 240 are rotational actuators. In one embodiment, the baffle actuators 240 are hydraulically-operated actuators (e.g., a hydraulic cylinder, a hydraulic motor, etc.). In another embodiment, the baffle actuators 240 are pneumatically-operated actuators (e.g., a pneumatic cylinder, a pneumatic motor, etc.). In another embodiment, the baffle actuators 240 are electrically-operated actuators (e.g., a solenoid, an electric motor, etc.).

As shown in FIGS. 11-16, the baffle actuators 240 are configured to facilitate selectively repositioning the baffle doors 210 between a plurality of orientations including a closed or restrictive orientation (see, e.g., FIGS. 11 and 14), an open or non-restrictive orientation (see, e.g., FIGS. 13 and 16), and an intermediate orientation between the closed orientation and the open orientation (see, e.g., FIGS. 12 and 15). The various orientations of the baffle doors 210 facilitate actively and dynamically restricting or reducing airflow through select portions or components of the cooling pack 101 to direct or increase airflow through other portions or components of the cooling pack 101 (e.g., based on a demand or current use of the vehicle 10, based on a temperature of respective components of the vehicle 10, etc.).

Figure 17:
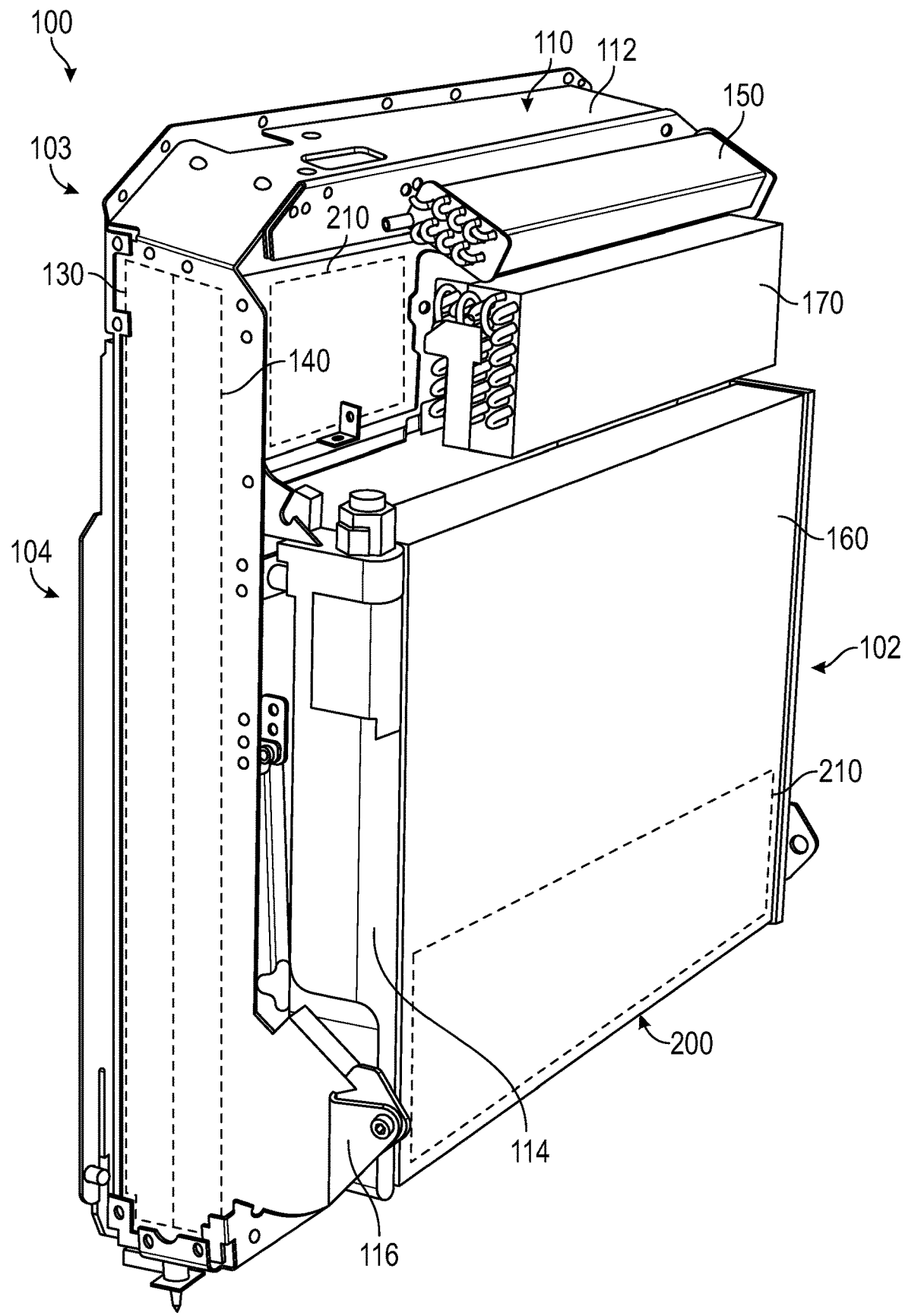
FIG. 17 is a front, right perspective view of a cooling system of the vehicle of FIG. 1 having a baffle system, according to another exemplary embodiment.
Figure 18:
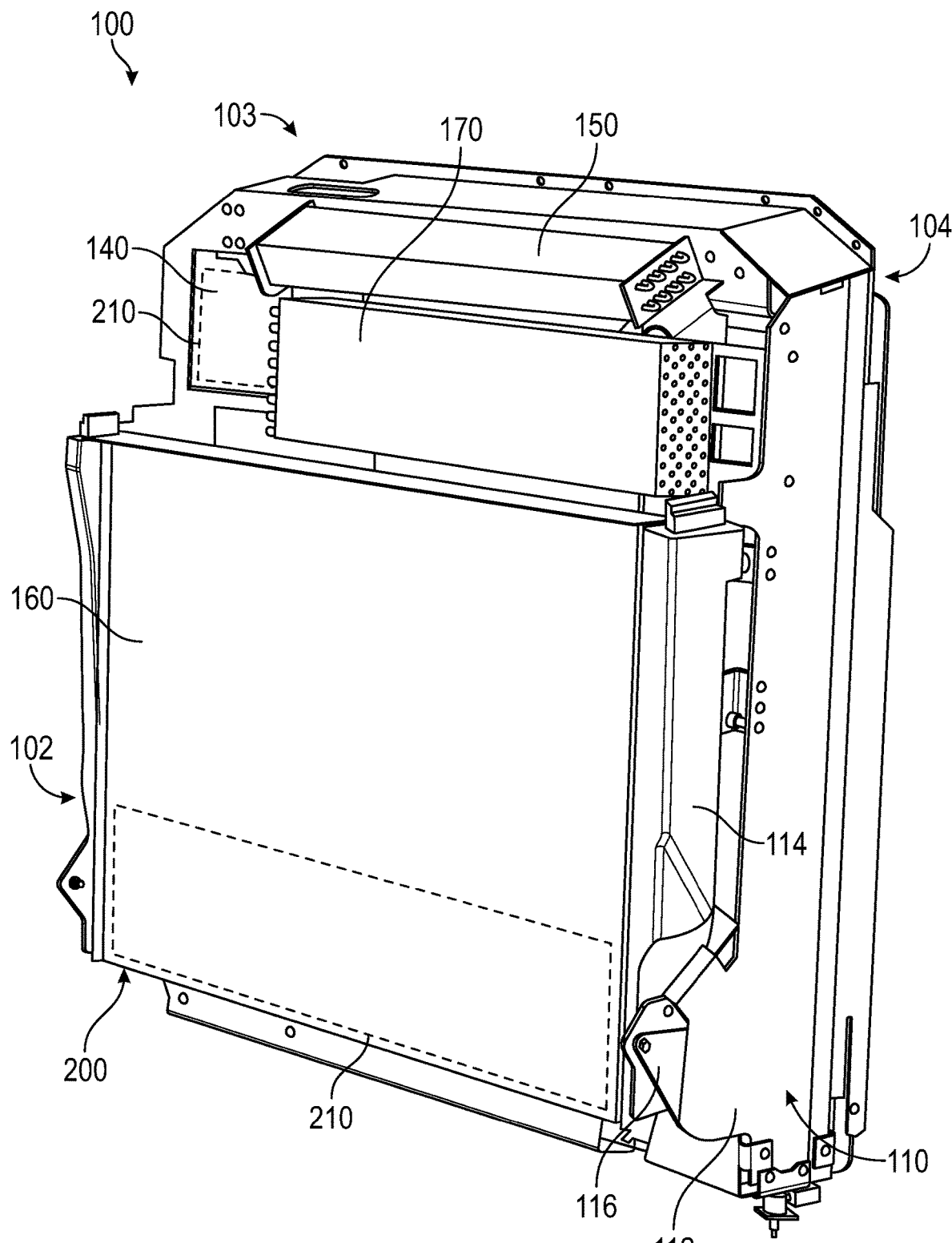
FIG. 18 is front, left perspective view of the cooling system of FIG. 17, according to an exemplary embodiment.
Figure 19:
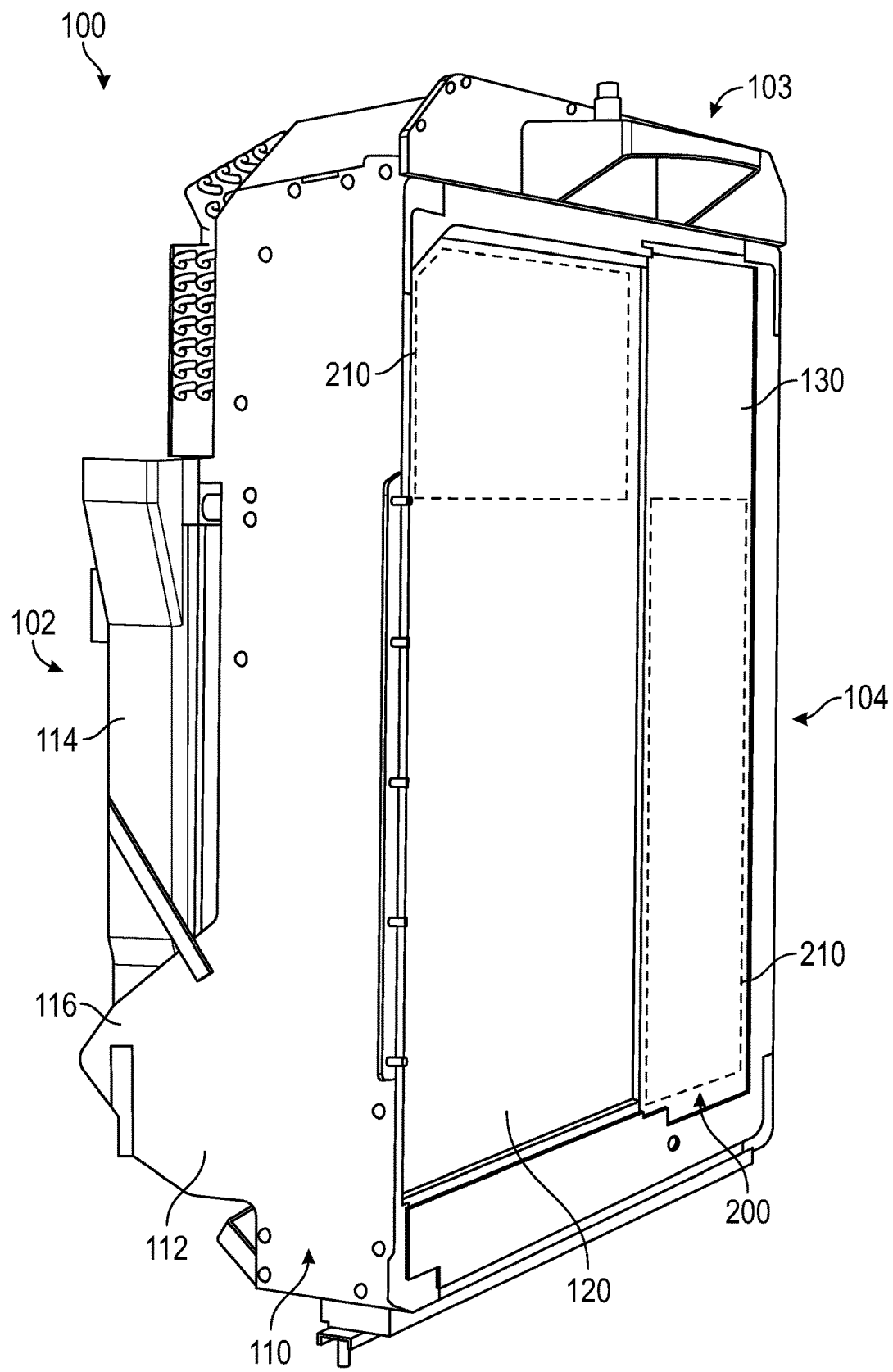
FIG. 19 is a rear, left perspective view of the cooling system of FIG. 17, according to an exemplary embodiment.

According to the exemplary embodiment shown in FIGS. 17-19, the cooling system 100 includes a second cooling pack, shown as cooling pack 103. The cooling pack 103 is similar to the cooling pack 101, except the arrangement of (i) the components of the frame assembly 110 (e.g., the main frame 112, the secondary frame 114, etc.), (ii) the cooling components (e.g., the engine radiator 120, the hydraulic oil cooler 130, the transmission cooler 140, the fuel cooler 150, the charge air cooler 160, the condenser 170, etc.), and (iii) the components of the baffle system 200 (e.g., the baffle doors 210, etc.) differ. As shown in FIGS. 17 and 18, the secondary frame 114 is positioned in front of and spaced from a lower portion of the main frame 112, rather than the top portion as in the cooling pack 101.

As shown in FIGS. 17-19, the plurality of cooling components of the cooling pack 103 are arranged as follows: (i) the engine radiator 120 is disposed within and supported by the main frame 112; (ii) the hydraulic oil cooler 130 is disposed within and supported by the main frame 112 and positioned on the side of the engine radiator 120 (e.g., in a horizontal side-by-side arrangement); (iii) the transmission cooler 140 is disposed within and supported by the main frame 112 and positioned in front of the hydraulic oil cooler 130 (e.g., in a horizontal stacked arrangement); (iv) the fuel cooler 150 is coupled to the exterior of the frame assembly 110 such that the fuel cooler 150 is positioned at least partially in front of the engine radiator 120; (v) the charge air cooler 160 is disposed within and supported by the secondary frame 114 and positioned at least partially in front of the engine radiator 120 and the transmission cooler 140, and beneath the fuel cooler 150; and (vi) the condenser 170 is coupled to the exterior of the frame assembly 110 such that the condenser 170 is positioned vertically between the fuel cooler 150 and the charge air cooler 160, and at least partially in front of the engine radiator 120.

It should be understood the above description of the plurality of cooling components of the cooling pack 103 is for example purposes only and should not be considered limiting. In other embodiments, the cooling pack 103 includes different cooling components, includes additional cooling components, include fewer cooling components, and/or the cooling components thereof are arranged differently.

As shown in FIGS. 17 and 18, the baffle system 200 includes two front baffle doors 210 positioned on the front side 102 of the cooling pack 103: (i) a front upper baffle door 210 positioned in front of at least a portion of the transmission cooler 140 (and thereby the hydraulic oil cooler 130) and (ii) a front lower baffle door 210 positioned in front of at least a portion of the charge air cooler 160 (and thereby the engine radiator 120, the hydraulic oil cooler 130, and/or the transmission cooler 140). As shown in FIG. 19, the baffle system 200 additionally or alternatively includes two rear baffle doors 210 positioned on the rear side 104 of the cooling pack 103: (i) a rear left baffle door 210 positioned behind at least a portion of the engine radiator 120 (and thereby the fuel cooler 150, the condenser 170, and/or the charge air cooler 160) and (ii) a rear right baffle door 210 positioned behind at least a portion of the hydraulic oil cooler 130 (and thereby the transmission cooler 140 and/or the charge air cooler 160).

It should be understood the above description of the baffle doors 210 of the cooling pack 103 is for example purposes only and should not be considered limiting. In other embodiments, the baffle system 200 of the cooling pack 103 includes a different arrangement of the baffle doors 210. By way of example, the baffle system 200 may include the front upper baffle door 210 and the rear left baffle door 210. By way of another example, the baffle system 200 may include the rear right baffle door 210 and the front lower baffle door 210. By way of another example, the baffle system 200 may include only one baffle door 210. By way of another example, the baffle system 200 may include the front upper baffle door 210, the front lower baffle door 210, the rear left baffle door 210, and/or the rear right baffle door 210. By way of another example, the baffle doors 210 may be otherwise positioned (e.g., in front of the fuel cooler 150, in front of the condenser 170, etc.). By way of another example, the rear right baffle door 210 may extend along the entirely of the rear side of the hydraulic oil cooler 130. By way of another example, the rear left baffle door 210 may extend along the entirely of the rear side of the engine radiator 120.

In some embodiments, the baffle system 200 includes biasing elements (e.g., linear springs, torsional springs, etc.). In one embodiment, the biasing elements are configured to bias the baffle doors 210 into the open orientation and the baffle actuators 240 are configured to overcome the biasing force of the biasing elements to reposition the baffle doors 210 from the open orientation toward or to the closed orientation. In another embodiment, the biasing elements are configured to bias the baffle doors 210 into the closed orientation and the baffle actuators 240 are configured to overcome the biasing force of the biasing elements to reposition the baffle doors 210 from the closed orientation toward or to the open orientation.

Figure 20:
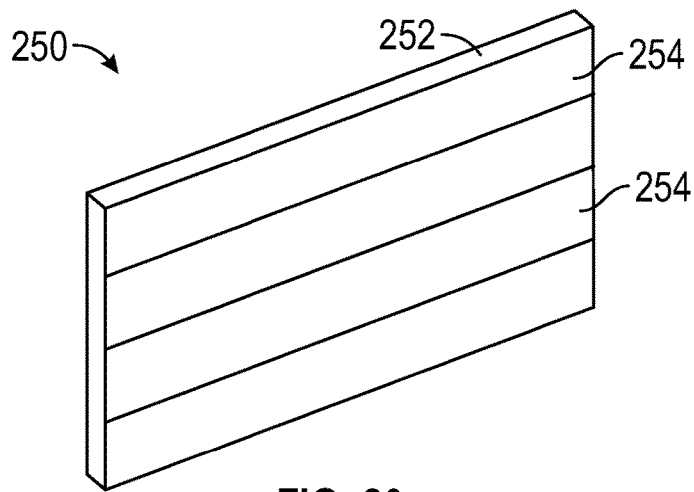
FIG. 20 is a detailed view of a baffle of the baffle system of FIGS. 7, 8, and 17-19 in a closed orientation, according to another exemplary embodiment.
Figure 21:
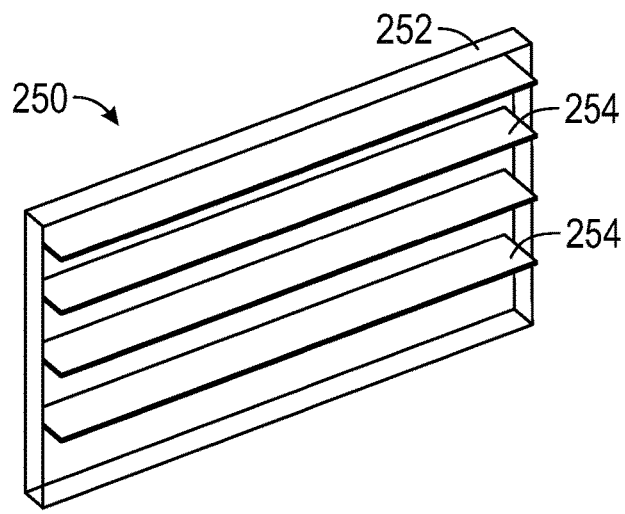
FIG. 21 is a detailed view of the baffle of FIG. 20 in an open orientation, according to an exemplary embodiment.

Referring now to FIGS. 20-23, alternatives to the baffle doors 210 are shown. As shown in FIGS. 20 and 21, the baffle doors 210 are replaceable by or supplemented with a baffle shutter assembly, shown as baffle shutter 250. The baffle shutter 250 includes an outer frame, shown as shutter housing 252, and a plurality of slats, shown as baffle slats 254, coupled to and disposed within the shutter housing 252. As shown in FIG. 20, the baffle slats 254 are positioned in a closed or restrictive orientation to restrict airflow through the baffle shutter 250. As shown in FIG. 21, the baffle slats 254 are pivoted into an open or non-restrictive orientation to permit unrestricted airflow through the baffle shutter 250. In some embodiments, the baffle slats 254 are positionable in an intermediate orientation or only a subset of the baffle slats 254 are selectively positionable in the open orientation to at least partially restrict airflow through the baffle shutter 250, while still permitting some air to pass through the baffle shutter 250 (e.g., permit airflow through the bottom portion only, the top portion only, the middle portion only, the top and middle portions only, the top and bottom portions only, the middle and bottom portions only, etc.).

In one embodiment, each baffle shutter 250 is positioned over a respective one or a portion of the respective one of the cooling components of the cooling pack 101 and/or the cooling pack 103 (e.g., a rear side of the engine radiator 120, a front side of the engine radiator 120, a rear side of the hydraulic oil cooler 130, a front side of the hydraulic oil cooler 130, a rear side of the transmission cooler 140, a front side of the transmission cooler 140, a rear side of the fuel cooler 150, a front side of the fuel cooler 150, a rear side of the charge air cooler 160, a front side of the charge air cooler 160, a rear side of the condenser 170, a front side of the condenser 170, etc.). In another embodiment, the baffle shutter 250 is positioned over then entire front side 102 or the entire rear side 104 of the cooling pack 101 and/or the cooling pack 103 (e.g., the shutter housing 252 of the baffle shutter 250 is coupled to the rear side 104 of the main frame 112 and has a substantially similar height and width as the main frame 112, the shutter housing 252 of the baffle shutter 250 is coupled to the front side 102 of the main frame 112 and/or the secondary frame 114 by brackets and has a substantially similar height and width as the main frame 112, etc.).

Figure 22:
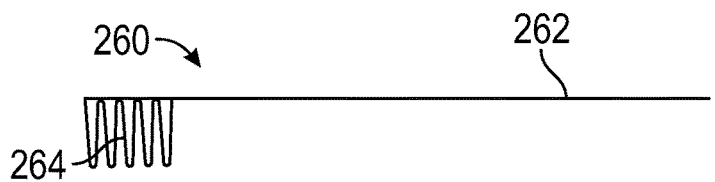
FIG. 22 is a detailed view of a baffle of the baffle system of FIGS. 7, 8, and 17-19 in an open orientation, according to another exemplary embodiment.
Figure 23:
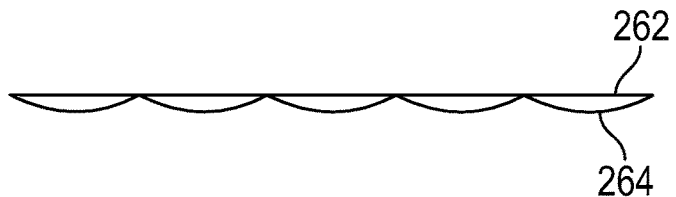
FIG. 23 is a detailed view of the baffle of FIG. 22 in a closed orientation, according to an exemplary embodiment.

As shown in FIGS. 22 and 23, the baffle doors 210 are replaceable by or supplemented with a retractable baffle assembly, shown as retractable baffle system 260. The retractable baffle system 260 includes rails, shown as baffle track 262, and a flexible (e.g., foldable, rollable, retractable, etc.) baffle panel, shown as retractable baffle 264, coupled to and selectively extendable along the baffle track 262. In other embodiments, the retractable baffle 264 is a rigid plate or panel that is retractable or slidable/translatable along the baffle track 262. As shown in FIG. 22, the retractable baffle 264 is retracted into an open or non-restrictive orientation to permit unrestricted airflow through the retractable baffle system 260. As shown in FIG. 23, the retractable baffle 264 is extended into a closed or restrictive orientation to restrict airflow through the retractable baffle system 260. In some embodiments, the retractable baffle 264 is retractable or extendable into an intermediate orientation to at least partially restrict airflow through the retractable baffle system 260, while still permitting some air to pass through the retractable baffle system 260.

Figure 24:
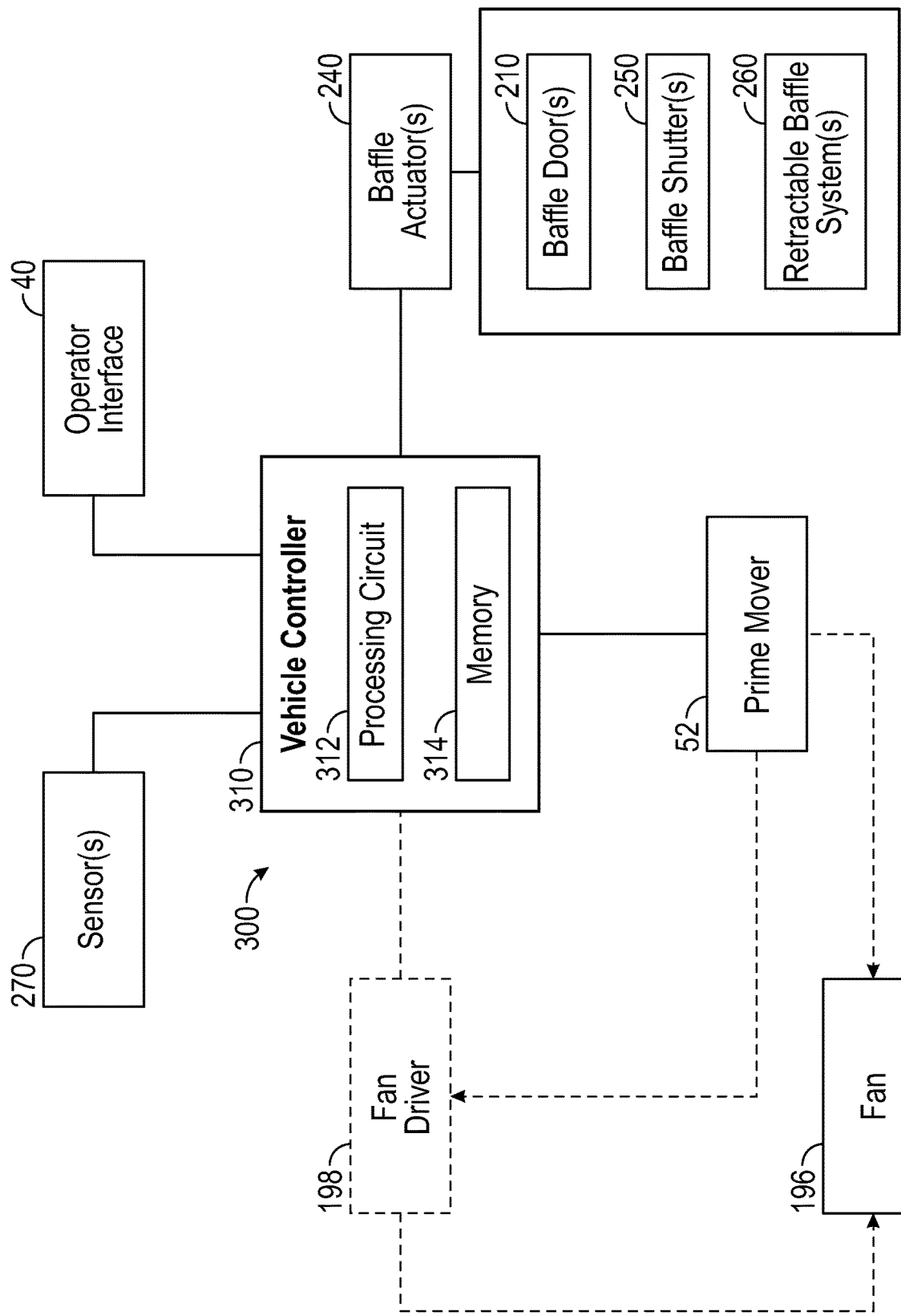
FIG. 24 is a schematic block diagram of a control system of the vehicle of FIG. 1, according to an exemplary embodiment.

According to the exemplary embodiment shown in FIG. 24, the control system 300 for the vehicle 10 includes a controller 310. In one embodiment, the controller 310 is configured to selectively engage, selectively disengage, control, or otherwise communicate with components of the vehicle 10. As shown in FIG. 24, the controller 310 is coupled to (e.g., communicably coupled to) the operator interface 40, the prime mover 52, a fan driver 198, the baffle actuators 240, and one or more sensors, shown as sensors 270. By way of example, the controller 310 may send and receive signals (e.g., control signals) with the operator interface 40, the prime mover 52, the fan driver 198, the baffle actuators 240, and/or the sensors 270.

The controller 310 may be implemented as a general-purpose processor, an application specific integrated circuit ("ASIC"), one or more field programmable gate arrays ("FPGAs"), a digital-signal-processor ("DSP"), circuits containing one or more processing components, circuitry for supporting a microprocessor, a group of processing components, or other suitable electronic processing components. According to the exemplary embodiment shown in FIG. 21, the controller 310 includes a processing circuit 312 and a memory 314. The processing circuit 312 may include an ASIC, one or more FPGAs, a DSP, circuits containing one or more processing components, circuitry for supporting a microprocessor, a group of processing components, or other suitable electronic processing components. In some embodiments, the processing circuit 312 is configured to execute computer code stored in the memory 314 to facilitate the activities described herein. The memory 314 may be any volatile or non-volatile computer-readable storage medium capable of storing data or computer code relating to the activities described herein. According to an exemplary embodiment, the memory 314 includes computer code modules (e.g., executable code, object code, source code, script code, machine code, etc.) configured for execution by the processing circuit 312. In some embodiments, the controller 310 may represent a collection of processing devices. In such cases, the processing circuit 312 represents the collective processors of the devices, and the memory 314 represents the collective storage devices of the devices.

In one embodiment, the fan driver 198 is a driver that is independent of the prime mover 52 (e.g., not driven through a PTO of the prime mover 52). By way of example, the fan driver 198 may be an electric motor. In another embodiment, the fan driver 198 is driven by the prime mover 52 (e.g., through a PTO of the prime mover 52). By way of example, the fan driver 198 may be a pneumatically-operated motor or a hydraulically-operated motor coupled to a pneumatic pump or a hydraulic pump, respectively, that is driven by the prime mover 52. In still another embodiment, the vehicle 10 does not include the fan driver 198, but instead the fan 196 is driven directly by the prime mover 52 (e.g., through a PTO of the prime mover 52, through a pulley assembly coupled to the PTO of the prime mover 52, etc.).

The sensors 270 may include one or more sensors that are configured to acquire sensor data to facilitate monitoring operational parameters/characteristics (e.g., temperatures, pressures, flow rates, etc.) of (i) the cooling components of the cooling pack 101 and/or the cooling pack 103 (e.g., the engine radiator 120, the hydraulic oil cooler 130, the transmission cooler 140, the fuel cooler 150, the charge air cooler 160, the condenser 170, etc.) and/or (ii) the components coupled thereto by the conduits 108 (e.g., the engine of the prime mover 52, the transmission 56, the hydraulic circuit, the fueling circuit, the charge air circuit, the air conditioning circuit, etc.) with the controller 310. By way of example, the sensors 270 may include one or more engine temperature sensors (e.g., an inlet engine coolant temperature sensor, an outlet engine coolant temperature sensor, an engine temperature sensor, etc.) that are configured to facilitate monitoring temperature of the engine coolant flowing into and/or out of the engine of the prime mover 52 and/or the engine radiator 120, and/or the temperature of the engine of the prime mover 52 itself. By way of another example, the sensors 270 may include one or more hydraulic temperature sensors (e.g., an inlet hydraulic oil temperature sensor, an outlet hydraulic oil temperature sensor, etc.) that are configured to facilitate monitoring temperature of the hydraulic oil of the hydraulic circuit of the vehicle 10 flowing into and/or out of the hydraulic oil cooler 130 and/or at other portions of the hydraulic circuit. By way of another example, the sensors 270 may include one or more transmission temperature sensors (e.g., an inlet transmission oil temperature sensor, an outlet transmission oil temperature sensor, etc.) that are configured to facilitate monitoring temperature of the transmission oil flowing into and/or out of the transmission cooler 140 and/or the transmission 56. By way of another example, the sensors 270 may include one or more fuel temperature sensors (e.g., an inlet fuel temperature sensor, an outlet fuel temperature sensor, etc.) that are configured to facilitate monitoring temperature of the fuel flowing into and/or out of the fuel cooler 150 and/or at other portions of the fueling circuit of the vehicle 10. By way of another example, the sensors 270 may include one or more charge air temperature sensors (e.g., an inlet charge air temperature sensor, an outlet charge air temperature sensor, etc.) that are configured to facilitate monitoring temperature of the charge air flowing into and/or out of the charge air cooler 160 and/or at other portions of the charge air circuit of the vehicle 10. By way of another example, the sensors 270 may include one or more air conditioning refrigerant temperature sensors (e.g., an inlet air conditioning refrigerant temperature sensor, an outlet air conditioning refrigerant temperature sensor, etc.) that are configured to facilitate monitoring temperature of the air conditioning refrigerant flowing into and/or out of the condenser 170 and/or at other portions of the air conditioning circuit of the vehicle 10. It should be understood that additional or different sensors (e.g., flow sensors, pressure sensors, etc.) may be used to facilitate monitoring the operational parameters/characteristics.

In some embodiments, the controller 310 is configured to control the actuators to actively reconfigure the orientation of the baffles (e.g., the baffle doors 210, the baffle shutters 250, the retractable baffle systems 260, etc.) based on the sensor data acquired by the one or more sensors 270. By way of example, the sensor data may indicate that the hydraulic oil within the hydraulic circuit is above or approaching a hydraulic oil temperature threshold (e.g., intensive work is being performed with a hydraulically-operated implement(s) of the vehicle 10, etc.), while the temperatures associated with the other cooling components (e.g., the engine radiator 120, the transmission cooler 140, the fuel cooler 150, the charge air cooler 160, the condenser 170, etc.) are at an acceptable or desirable level. The controller 310, instead of being configured to increase the speed of the fan 196, may be configured to control the baffle actuators 240 to (i) reconfigure one or more baffles that are not associated with the hydraulic oil cooler 130 (e.g., the front upper baffle door 210, the rear upper baffle door 210, etc. of the cooling pack 101; the rear left baffle door 210, etc. of the cooling pack 103) such that the one or more baffles that are not associated with the hydraulic oil cooler 130 at least partially close (e.g., an intermediate orientation, a closed orientation, etc.) and/or (ii) reconfigure one or more baffles that are associated with the hydraulic oil cooler 130 (e.g., the front lower baffle door 210, the rear lower baffle door 210, etc. of the cooling pack 101; the front upper baffle door 210, the front lower baffle door 210, the rear right baffle door 210, etc. of the cooling pack 103) such that the one or more baffles that are associated with the hydraulic oil cooler 130 at least partially open (e.g., an intermediate orientation, an open orientation, if previously closed or partially closed, open more than previously, etc.). Such active baffle control may thereby at least partially restrict airflow through one or more of the other cooling components and divert additional or increases airflow through the hydraulic oil cooler 130, without having to increase the speed of the fan 196, to provide increased or improved cooling capability for the hydraulic oil cooler 130. It should be understood that while the above active baffle control is described with respect the hydraulic oil cooler 130, similar logic could be used for each of the cooling components of the cooling pack 101 and/or the cooling pack 103 (e.g., the engine radiator 120, the hydraulic oil cooler 130, the transmission cooler 140, the fuel cooler 150, the charge air cooler 160, the condenser 170, etc.).

In some embodiments, the controller 310 is configured to control the actuators to actively reconfigure the orientation of the baffles (e.g., the baffle doors 210, the baffle shutters 250, the retractable baffle systems 260, etc.) based on a current use of the vehicle 10. By way of example, the operator of the vehicle 10 may engage with the operator interface 40 to simply drive the vehicle 10. The controller 310 may, therefore, be configured to reconfigure one or more baffles that are associated with the hydraulic oil cooler 130 (e.g., the front lower baffle door 210, the rear lower baffle door 210, etc. of the cooling pack 101; the front upper baffle door 210, the front lower baffle door 210, the rear right baffle door 210, etc. of the cooling pack 103) such that the one or more baffles that are associated with the hydraulic oil cooler 130 at least partially close (e.g., an intermediate orientation, an closed orientation, if previously open or partially open, open more than previously, etc.) because the hydraulic circuit of the vehicle 10 is not currently in use and, therefore, cooling thereof may not be needed. As a result, the airflow that would have flown through the hydraulic oil cooler 130 is diverted elsewhere and fan speed may be reduced (e.g., reducing engine loading, reducing required fan speed, reducing engine noise, increasing fuel efficiency, etc.).

However, the operator may subsequently engage the operator interface 40 to park the vehicle 10 and begin using a hydraulically-operated implement of the vehicle 10. In response, the controller 310 may be configured to control the baffle actuators 240 to (i) reconfigure one or more baffles that are not associated with the hydraulic oil cooler 130 (e.g., the front upper baffle door 210, the rear upper baffle door 210, etc. of the cooling pack 101; the rear left baffle door 210, etc. of the cooling pack 103) such that the one or more baffles that are not associated with the hydraulic oil cooler 130 at least partially close (e.g., an intermediate orientation, a closed orientation, etc.) and/or (ii) reconfigure one or more baffles that are associated with the hydraulic oil cooler 130 (e.g., the front lower baffle door 210, the rear lower baffle door 210, etc.) such that the one or more baffles that are associated with the hydraulic oil cooler 130 at least partially open (e.g., an intermediate orientation, an open orientation, if previously closed or partially closed, open more than previously, etc.). Such control preemptively focuses more cooling on the components currently in use by diverting cooling from components in a low loading condition or not being used at present. Again, it should be understood that while the above active baffle control is described with respect the hydraulic oil cooler 130, similar logic could be used for each of the cooling components of the cooling system 100 (e.g., the engine radiator 120, the hydraulic oil cooler 130, the transmission cooler 140, the fuel cooler 150, the charge air cooler 160, the condenser 170, etc.).

Such active baffle and fan speed control may provide noise reduction (e.g., as a result of lower fan speeds, lower engine speeds, etc.), increased fuel efficiency through engine demand reductions, and improved component cooling (e.g., by directing airflow where most needed and restricting airflow where not needed), which would allow for increased productivity with the vehicle 10.

As utilized herein with respect to numerical ranges, the terms "approximately," "about," "substantially," and similar terms generally mean +/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

The hardware and data processing components used to implement the various processes, operations, illustrative logics, logical blocks, modules, and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the vehicle 10 and the systems and components thereof (e.g., the driveline 50, the cooling system 100, the cooling pack 101, the cooling pack 103, the control system 300, etc.) as shown in the various exemplary embodiments is illustrative only. Additionally, any element disclosed in one embodiment may be incorporated or utilized with any other embodiment disclosed herein.

The invention claimed is:

1. A cooling system for a machine, the cooling system comprising:
   a first cooler;
   a second cooler;
   a frame supporting the first cooler and the second cooler;
   a fan positioned to drive air through the first cooler and the second cooler; and
   a baffle system including a baffle assembly, the baffle assembly including:
      a single baffle coupled to the frame and positioned to facilitate selectively restricting airflow through at least a portion of the first cooler; and
      an actuator positioned to facilitate reconfiguring the single baffle between (i) a first orientation where the single baffle does not restrict the airflow through the portion of the first cooler and (ii) a second orientation where the single baffle restricts the airflow through the portion of the first cooler, thereby diverting additional airflow through the second cooler.

2. The cooling system of claim 1, wherein the fan is positioned in front of the first cooler and the second cooler.

3. The cooling system of claim 1, wherein the fan is positioned behind the first cooler and the second cooler.

4. The cooling system of claim 1, wherein the single baffle is positioned in front of the first cooler.

5. The cooling system of claim 1, wherein the single baffle is positioned behind the first cooler.

6. The cooling system of claim 1, wherein the single baffle is or includes a rigid, pivotable baffle.

7. The cooling system of claim 1, wherein the single baffle is or includes a rigid, translatable baffle.

8. The cooling system of claim 1, wherein the baffle assembly is a first baffle assembly, the single baffle is a first single baffle, and the actuator is a first actuator, and wherein the baffle system includes a second baffle assembly separate from the first baffle assembly, the second baffle assembly including:
   a second single baffle coupled to the frame and positioned in front of or behind the second cooler to selectively restrict the airflow through at least a portion of the second cooler; and
   a second actuator positioned to reconfigure the second single baffle between (i) a first orientation where the second single baffle does not restrict the airflow through the portion of the second cooler and (ii) a second orientation where the second single baffle restricts the airflow through the portion of the second cooler, thereby diverting additional airflow through the first cooler.

9. The cooling system of claim 8, wherein the first single baffle of the first baffle assembly is positioned in front of the first cooler and the second single baffle of the second baffle assembly is positioned behind the second cooler.

10. The cooling system of claim 1, further comprising a control system, the control system including:
   one or more sensors configured to acquire data regarding operation of at least one of the first cooler, the second cooler, a first component coupled to the first cooler, or a second component coupled to the second cooler; and
   a controller configured to control the actuator to reconfigure the single baffle between the first orientation and the second orientation based on the data.

11. The cooling system of claim 1, wherein the first cooler is configured to couple to a first component of the machine, and wherein the second cooler is configured to couple to a second component of the machine, further comprising a controller configured to control the actuator to (i) reconfigure the single baffle into the first orientation when the first component is in use and (ii) reconfigure the single baffle into the second orientation when the first component is not in use.

12. The cooling system of claim 11, wherein the first component is a transmission or a hydraulic circuit including a hydraulically-operated implement, and wherein the second component is an engine.

13. The cooling system of claim 1, further comprising a biasing element positioned to bias the single baffle into one of the first orientation or the second orientation.

14. The cooling system of claim 1, wherein the actuator is (i) a hydraulically-operated actuator, a pneumatically-operated actuator, an electrically-operated actuator and (ii) a linear actuator or a rotational actuator.

15. The cooling system of claim 1, wherein the portion of the first cooler is an entirety of the first cooler.

16. The cooling system of claim 1, wherein the baffle assembly includes a bracket coupled directly to and extending from the frame, and wherein the single baffle is pivotably coupled to the bracket.

17. A machine comprising:
an engine;
a transmission coupled to the engine;
a charge air circuit coupled to the engine and including a turbocharger;
a hydraulic circuit including a hydraulically-operated implement; and
a cooling system including:
a first frame;
a second frame coupled to the first frame and positioned in front of a portion of the first frame in a stacked arrangement;
an engine radiator disposed within and supported by the first frame, the engine radiator fluidly coupled to the engine;
a hydraulic oil cooler disposed within and supported by the first frame, the hydraulic oil cooler positioned beneath or to the side of the engine radiator, the hydraulic oil cooler fluidly coupled to the hydraulic circuit;
a transmission cooler coupled to the first frame, the transmission cooler positioned in front of at least a portion of the hydraulic oil cooler, the transmission cooler fluidly coupled to the transmission;
a charge air cooler disposed within and supported by the second frame such that the charge air cooler is positioned in front of a portion of the engine radiator, the charge air cooler fluidly coupled to the charge air circuit;
a fan positioned to drive air through the engine radiator, the hydraulic oil cooler, the transmission cooler, and the charge air cooler; and
a baffle system including:
one or more brackets coupled directly to at least one of the first frame or the second frame;
one or more baffles positioned to facilitate selectively restricting airflow through at least one of the engine radiator, the hydraulic oil cooler, the transmission cooler, or the charge air cooler, each of the one or more baffles coupled to a respective one of the one or more brackets; and
one or more actuators positioned to facilitate reconfiguring the one or more baffles between a non-restrictive orientation and a restrictive orientation.

18. The machine of claim 17, wherein the one or more baffles include at least two of (i) a first baffle positioned in front of at least a portion of the charge air cooler, (ii) a second baffle positioned in front of at least a portion of the hydraulic oil cooler, (iii) a third baffle positioned behind at least a portion of the engine radiator, and (iv) a fourth baffle positioned behind at least a portion of the hydraulic oil cooler.

19. The machine of claim 18, wherein the one or more baffles include the second baffle or the fourth baffle, further comprising a controller configured to control the one or more actuators to (i) reconfigure the second baffle or the fourth baffle into the non-restrictive orientation when the hydraulically-operated implement is in use and (ii) reconfigure the second baffle or the fourth baffle into the restrictive orientation when the hydraulically-operated implement is not in use.

20. A cooling system for a machine, the cooling system comprising:
a first frame;
a second frame coupled to the first frame and positioned in front of a portion of first frame in a stacked arrangement;
an engine radiator disposed within and supported by the first frame, the engine radiator configured to fluidly couple to an engine of the machine;
a hydraulic oil cooler disposed within and supported by the first frame, the hydraulic oil cooler positioned beneath the engine radiator, the hydraulic oil cooler configured to fluidly couple to a hydraulic circuit of the machine;
a transmission cooler coupled to an exterior of the first frame, the transmission cooler positioned in front of a portion of the hydraulic oil cooler, the transmission cooler configured to fluidly couple to a transmission of the machine;
a charge air cooler disposed within and supported by the second frame, the charge air cooler positioned in front of a portion of the engine radiator, the charge air cooler configured to fluidly couple to a charge air circuit of the machine;
a fan positioned to drive air through the engine radiator, the hydraulic oil cooler, the transmission cooler, and the charge air cooler;
a baffle system including:
a plurality of baffles positioned to facilitate selectively restricting airflow through at least two of the engine radiator, the hydraulic oil cooler, the transmission cooler, or the charge air cooler; and
a plurality of actuators positioned to facilitate reconfiguring the plurality of baffles between a non-restrictive orientation and a restrictive orientation;
a plurality of sensors configured to acquire data regarding operation of the cooling system; and
a controller configured to control the plurality of actuators to selectively reconfigure each of the plurality of baffles between the non-restrictive orientation and the restrictive orientation based on the data.

* * * * *